United States Patent
Garner et al.

(10) Patent No.: US 9,775,279 B2
(45) Date of Patent: Oct. 3, 2017

(54) SEED VALVE AND PLANTING METHOD FOR MULTIPLE SEED TYPES

(71) Applicant: Deere & Company, Moline, IL (US)

(72) Inventors: Elijah B. Garner, Bettendorf, IA (US); Kamalakannan Natarajan, Vellore (IN); Daniel Kirtley, Kewanee, IL (US)

(73) Assignee: DEERE & COMPANY, Moline, IL (US)

( * ) Notice: Subject to any disclaimer, the term of this patent is extended or adjusted under 35 U.S.C. 154(b) by 15 days.

(21) Appl. No.: 14/686,397

(22) Filed: Apr. 14, 2015

(65) Prior Publication Data

US 2015/0319916 A1 Nov. 12, 2015

Related U.S. Application Data

(60) Provisional application No. 61/991,256, filed on May 9, 2014.

(51) Int. Cl.
*A01C 7/20* (2006.01)
*A01C 7/16* (2006.01)
(Continued)

(52) U.S. Cl.
CPC .............. *A01C 7/08* (2013.01); *A01B 79/005* (2013.01); *A01C 7/046* (2013.01); *A01C 7/16* (2013.01); *A01C 21/005* (2013.01)

(58) Field of Classification Search
CPC ....... A01C 7/04; A01C 17/006; A01C 17/008; A01C 21/005; A01B 79/005
See application file for complete search history.

(56) References Cited

U.S. PATENT DOCUMENTS 4,280,419 A * 7/1981 Fischer .................. A01C 15/04
111/174
4,592,484 A 6/1986 Pregermain
(Continued)

FOREIGN PATENT DOCUMENTS

EP 0100723 A1 2/1984
EP 2061301 A2 5/2009
(Continued)

OTHER PUBLICATIONS

EPO Search Report issued in counterpart application No. 15166743.3 dated Oct. 1, 2015 (10 pages).

*Primary Examiner* — John G Weiss

(57) ABSTRACT

Various planting machines and planting methods are described. A planting method may include filling a seed pool with first-type seed, metering the first-type seed from the seed pool with a metering member, and then evacuating the first-type seed from the seed pool. The method may further include filling the seed pool with second-type seed, metering the second-type seed with the metering member, evacuating the second-type seed from the seed pool, and then refilling the seed pool with the first-type seed. First-type and second-type seed may be evacuated to separate temporary storage chambers, and the seed pool may be filled from the temporary storage chambers, as well as from bulk storage containers. A seed valve of a planting machine may include temporary seed storage chambers for different seed types. The seed valve may fill and evacuate a seed pool through rotation of various valve members and selective application of a vacuum.

18 Claims, 27 Drawing Sheets

(51) Int. Cl.
*A01C 7/08* (2006.01)
*A01C 21/00* (2006.01)
*A01B 79/00* (2006.01)
*A01C 7/04* (2006.01)

(56) References Cited

U.S. PATENT DOCUMENTS

| | | | | |
|---|---|---|---|---|
| 5,915,313 A * | 6/1999 | Bender | ............... | A01B 79/005 111/178 |
| 6,516,733 B1 * | 2/2003 | Sauder | ............... | A01C 21/005 111/180 |
| 6,672,228 B1 * | 1/2004 | Groelz | ............... | A01C 7/102 111/177 |
| 6,834,600 B1 | 12/2004 | Clewell | | |
| 8,543,238 B2 * | 9/2013 | Straeter | ............... | A01C 7/10 111/11 |
| 8,948,976 B1 * | 2/2015 | Unruh | ............... | A01C 21/005 111/171 |
| 8,948,980 B2 * | 2/2015 | Garner | ............... | A01C 7/08 111/185 |
| 9,148,992 B2 * | 10/2015 | Staeter | ............... | A01C 21/005 |
| 9,237,687 B2 * | 1/2016 | Sauder | ............... | A01C 5/064 |
| 9,332,689 B2 * | 5/2016 | Baurer | ............... | A01C 7/105 |
| 9,360,121 B2 * | 6/2016 | Garner | ............... | F16K 3/02 |
| 2015/0059630 A1 * | 3/2015 | Kinzenbaw | ............... | A01C 7/044 111/200 |
| 2015/0223391 A1 * | 8/2015 | Wendte | ............... | A01C 7/04 111/177 |

FOREIGN PATENT DOCUMENTS

| | | |
|---|---|---|
| FR | 2389316 A1 | 12/1978 |
| WO | 2012135015 A2 | 10/2012 |
| WO | 03055291 A2 | 7/2013 |

* cited by examiner

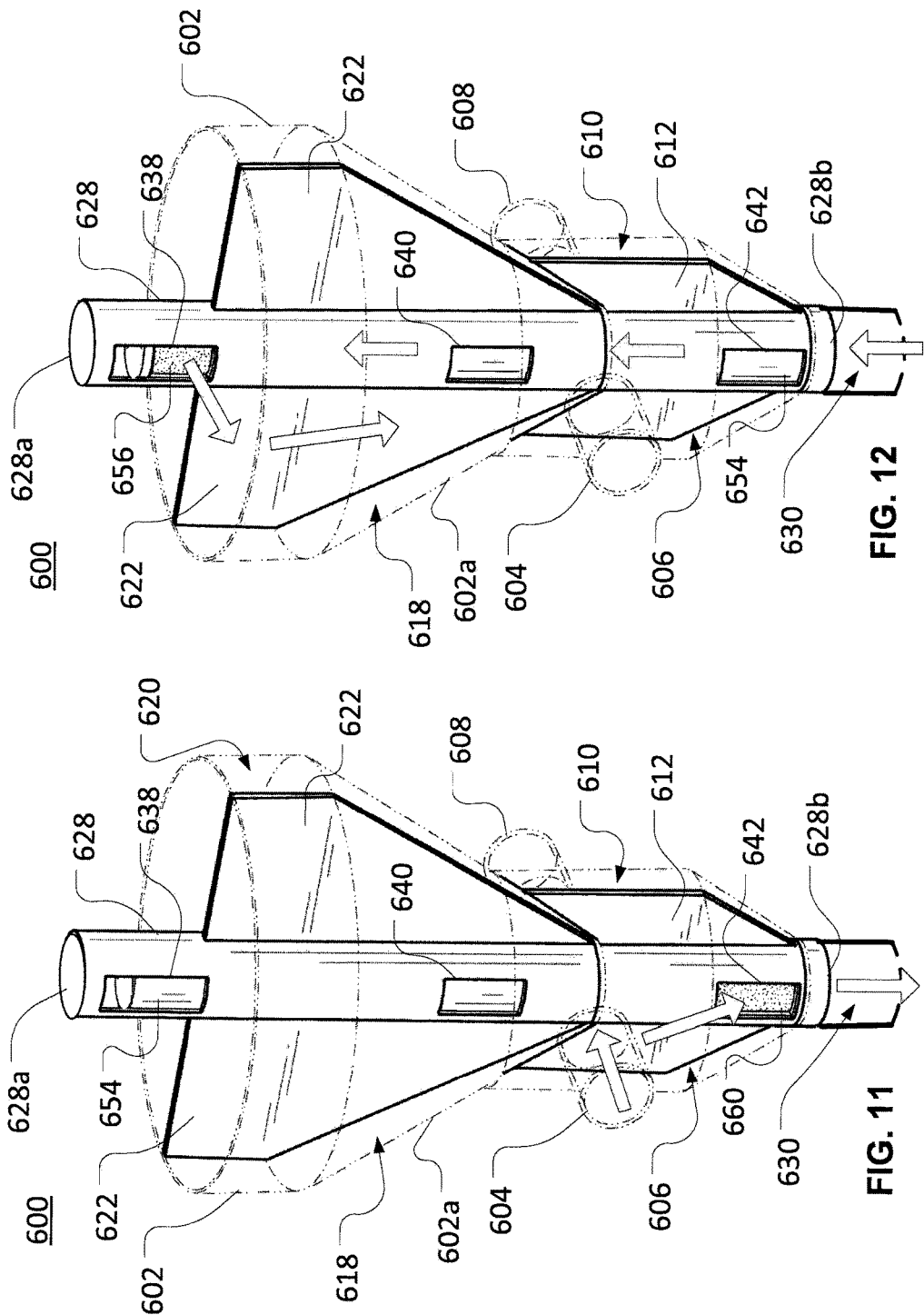

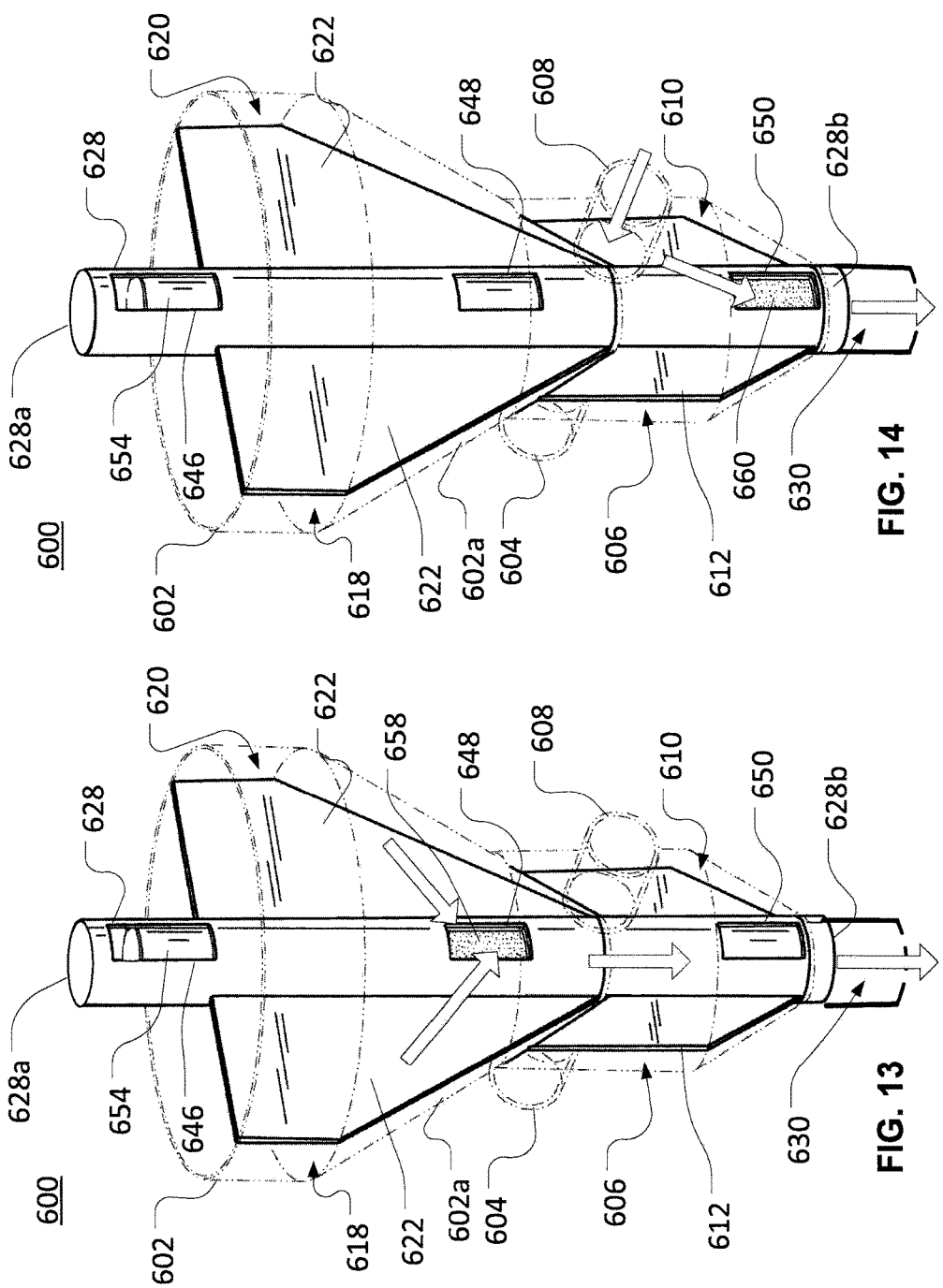

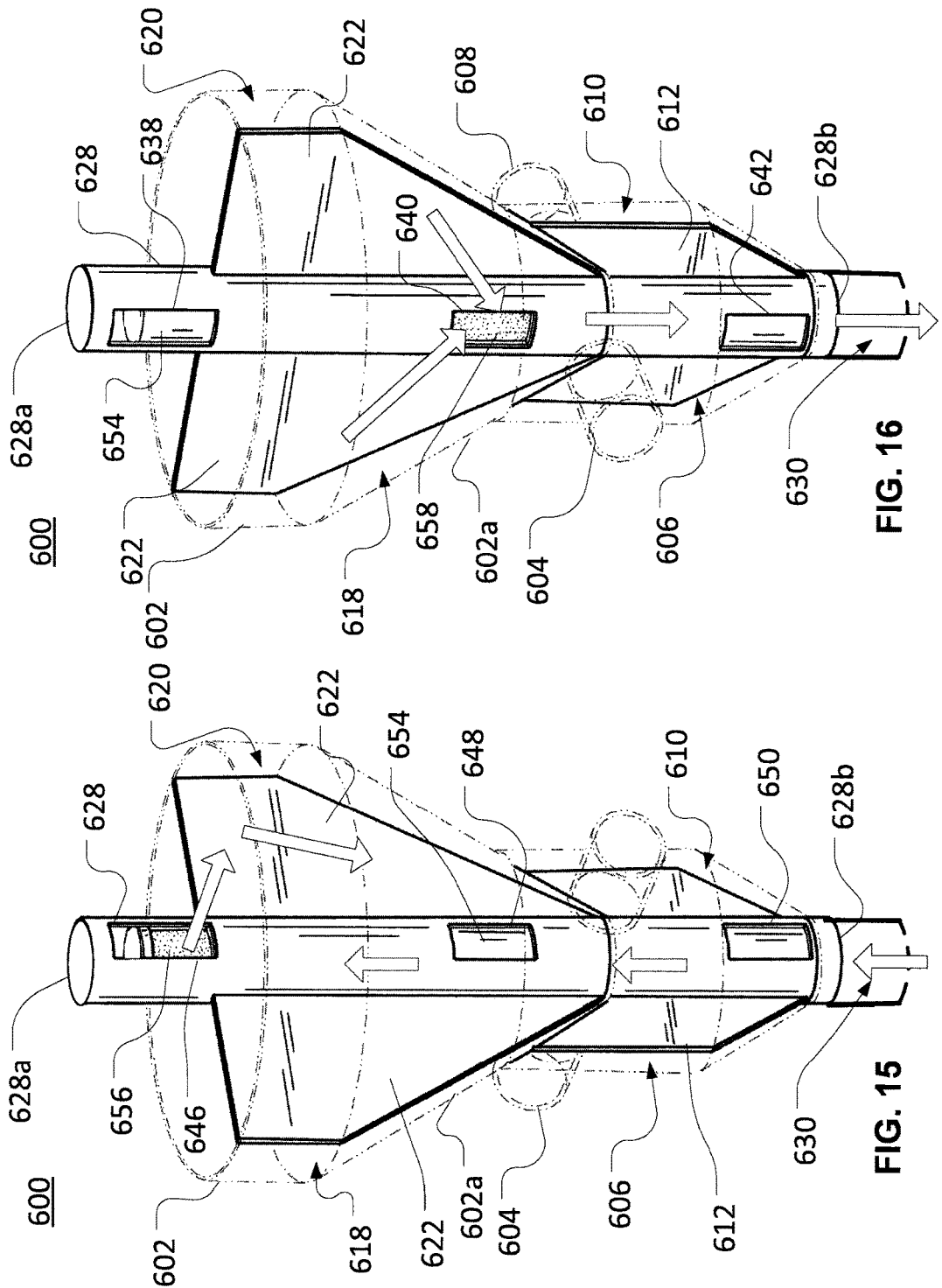

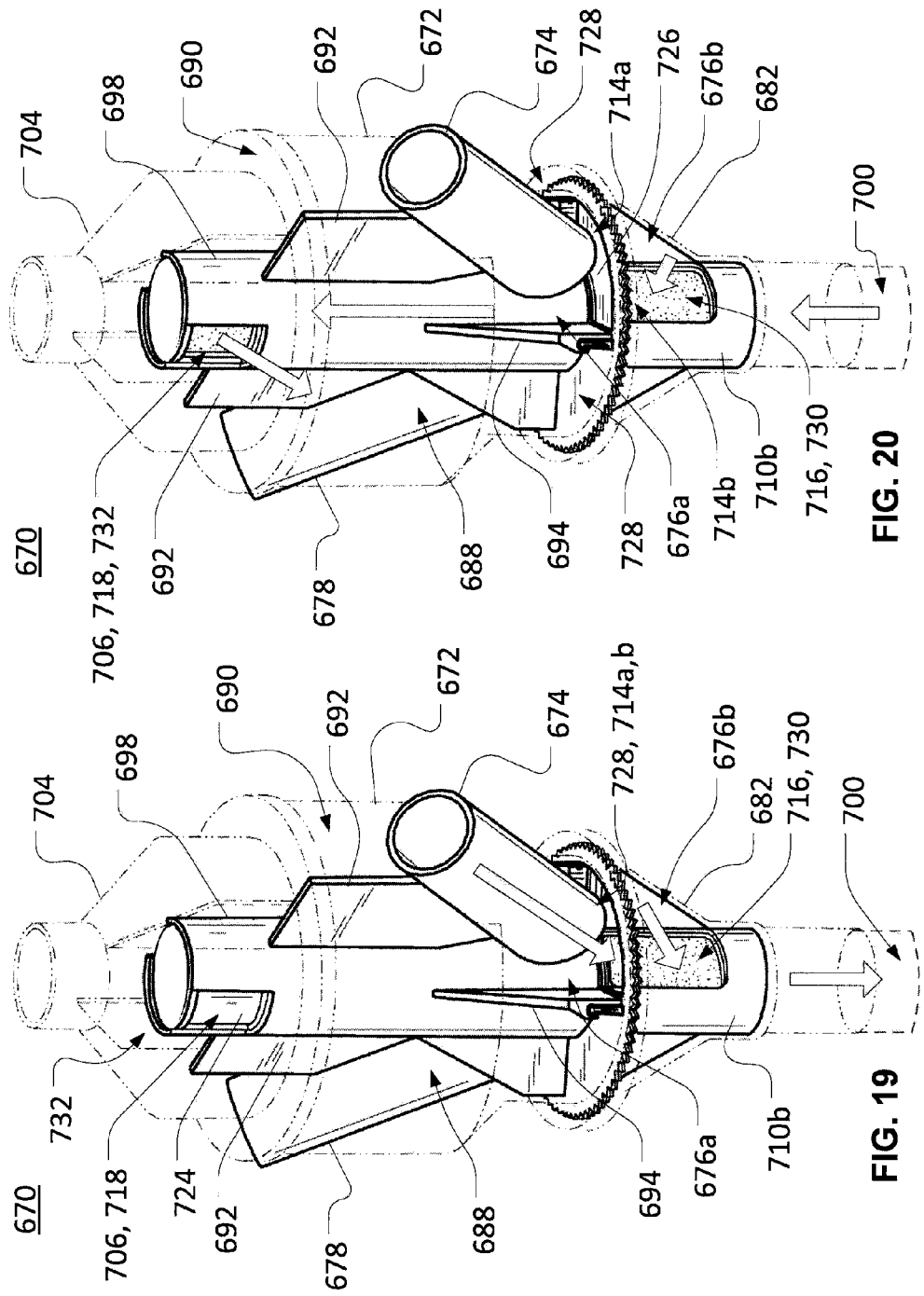

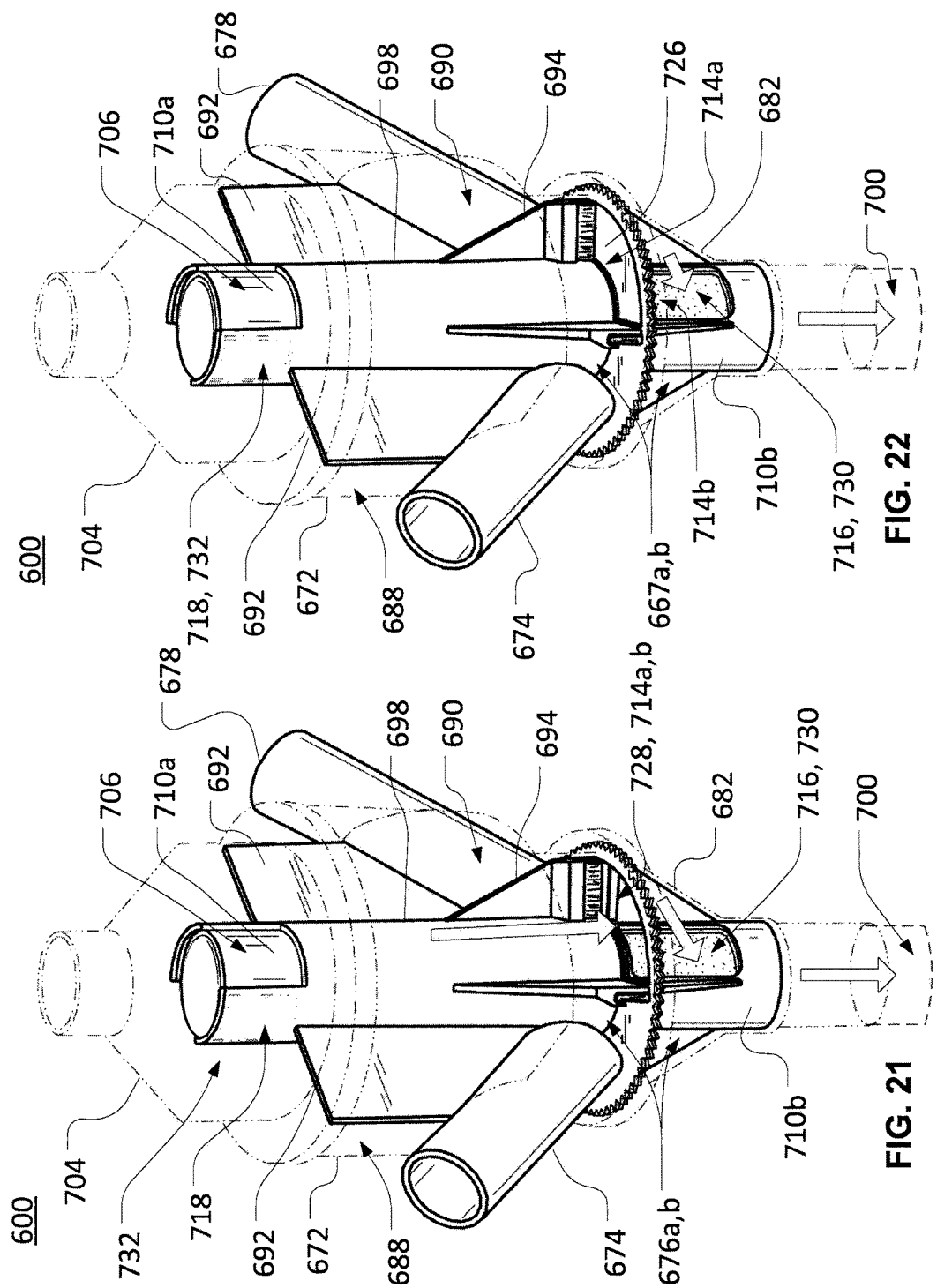

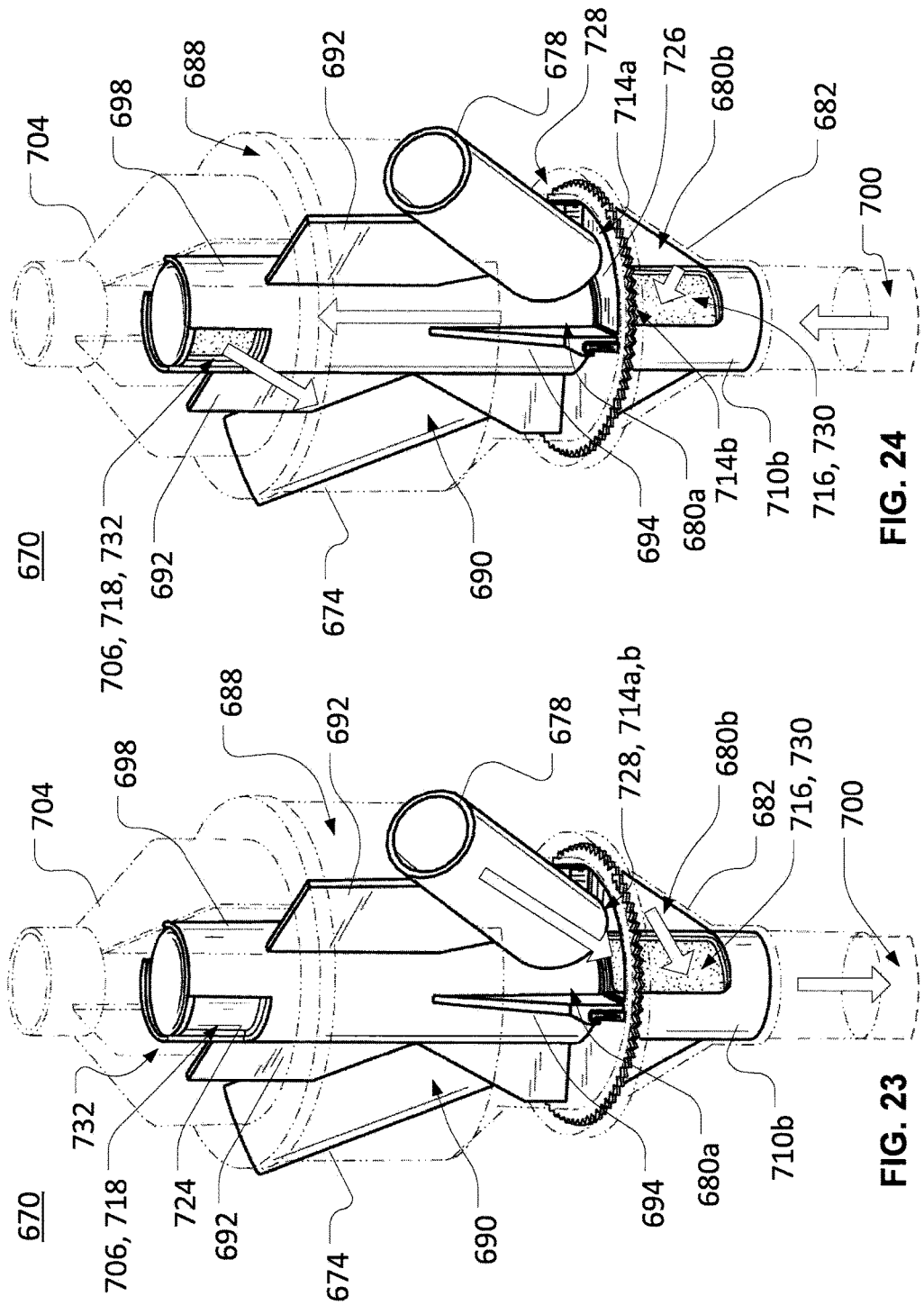

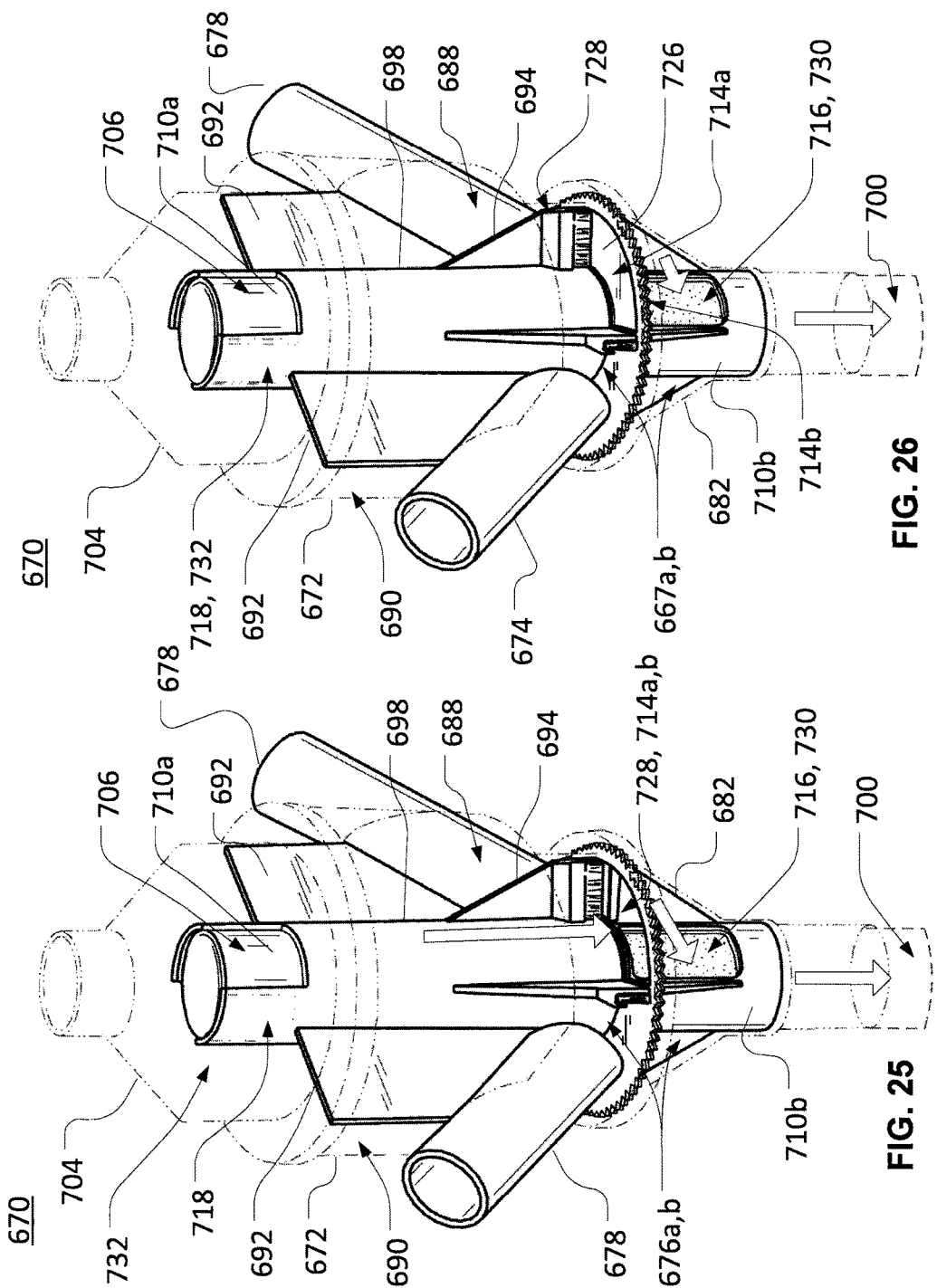

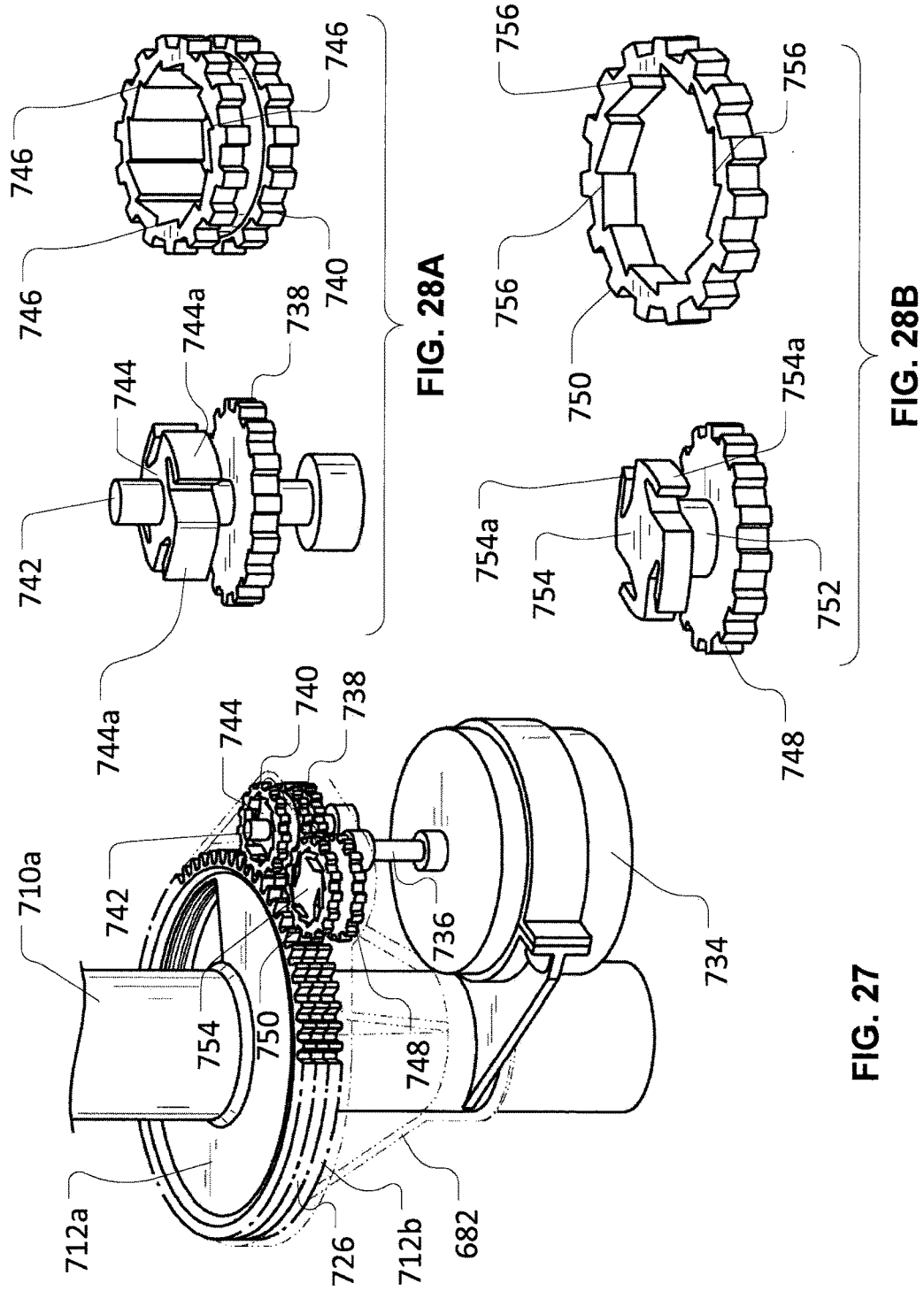

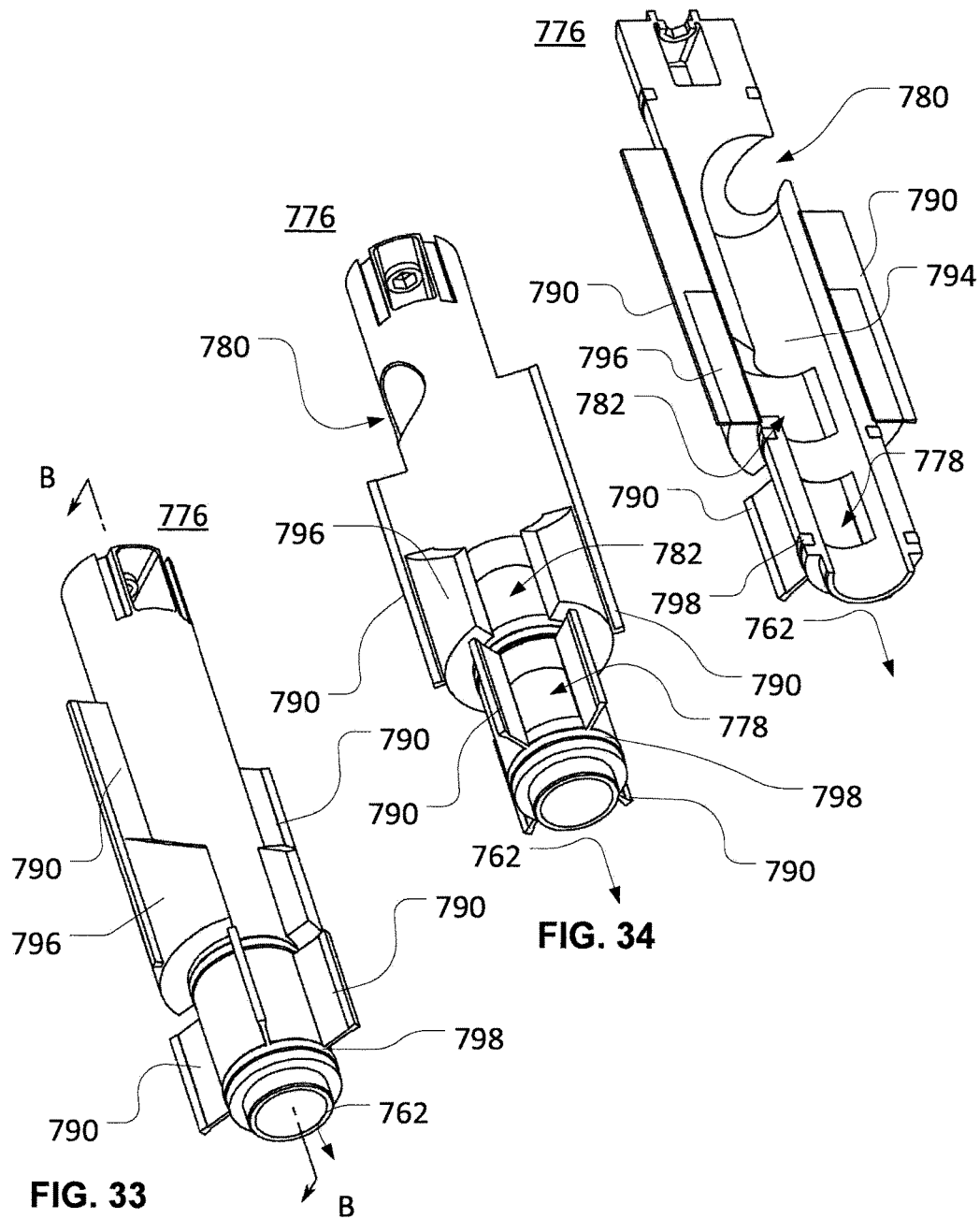

SEED VALVE AND PLANTING METHOD FOR MULTIPLE SEED TYPES

CROSS-REFERENCE TO RELATED APPLICATIONS

Not Applicable.

STATEMENT OF FEDERALLY SPONSORED RESEARCH OR DEVELOPMENT

Not applicable.

FIELD OF THE DISCLOSURE

The following relates to a planting unit for a seeding machine and more particularly to a planting unit for planting multiple seed types.

BACKGROUND OF THE DISCLOSURE

For planting machines of various configurations and various other seed transport devices, it may also be useful to facilitate the planting of multiple seed types (e.g., multiple seed varieties, seeds with differing characteristics, or seeds from multiple sources) during a single planting operation. For example, if conditions in a field vary between different regions of the field with respect to soil variations, disease or pest pressures, and so on, it may be useful to plant seed of different types in the different regions, with the particular type of seed for a particular region being selected to appropriately address the local field conditions. As a planting vehicle (or other apparatus) travels in an efficient path over the field, however, the vehicle may tend to pass in and out of the various regions, so it may be necessary to switch between seed types in order to plant the various seed types in the appropriate field regions. Further, manual switching of seed types may be unacceptably time consuming. Accordingly, it may be useful to provide a seed-management method and related devices that may allow for relatively seamless transition between the seed types as the planting vehicle passes in and out of the various field regions.

SUMMARY OF THE DISCLOSURE

A planting machine and method of operating a planting machine are disclosed, for managing the planting of multiple seed types.

According to one aspect of the disclosure, a planting method may include filling a seed pool with first-type seed, metering the first-type seed from the seed pool with a metering member while continually replenishing the seed pool, and then evacuating the first-type seed from the seed pool. The method may further include filling the seed pool with second-type seed, metering the second-type seed with the metering member, again while continually replenishing the seed pool, evacuating the second-type seed from the seed pool, and then refilling the seed pool with the first-type seed. First-type and second-type seed may be evacuated to separate temporary storage chambers, and the seed pool may be filled from the temporary storage chambers, as well as from bulk storage containers.

In certain embodiments, a single seed passage may be utilized to fill and evacuate the seed pool with both first-type and second-type seed. The metering member may continuously operate during the various filling and evacuation operations. When the seed pool is not filled with first-type or second-type seed, the metering member may be supplied with seed from a supplemental seed chamber within the housing, the supplemental seed chamber being separate from the seed pool.

According to another aspect of the disclosure, a planting machine includes a seed valve with temporary seed storage chambers for different seed types. The seed valve may include a first-type seed inlet and a separate second-type seed inlet. A seed passage may extend between the interior of a seed meter housing and the seed valve.

In certain embodiments, the seed valve may utilize a vacuum to evacuate seed from a seed pool of the seed meter. The seed valve may include various rotatable valve members nested within a valve passage of the seed valve. Flow passage openings may be provided on the valve passage and control openings may be provided on the valve members. The valve members may be rotated within the valve passage to align certain control openings with certain flow passage openings in order to provide a flow passage between various portions of the seed valve and the seed pool within the seed meter.

BRIEF DESCRIPTION OF THE DRAWINGS

FIGS. 11-16 are perspective views of the operation of an example seed valve including the valve member of FIG. 10, during a planting operation involving multiple seed types;

FIGS. 19-26 are perspective views of the operation of the seed valve of FIG. 17 during another planting operation involving multiple seed types;

FIG. 27 is a perspective view of a drive mechanism for operation of the seed valve of FIG. 17;

FIGS. 28A and 28B are perspective views of certain components of the drive mechanism of FIG. 27

FIGS. 33 and 34 are perspective views of a valve member of the seed valve of FIGS. 29 and 30;

FIG. 35 is a perspective view of the valve member of FIGS. 33 and 34, depicting a cross-section along plane B-B of FIG. 33;

Like reference symbols in the various drawings indicate like elements.

DETAILED DESCRIPTION

The following describes one or more example embodiments of the methods and seed valves for managing multiple seed varieties, as shown in the accompanying figures of the drawings described briefly above. Various modifications to the example embodiments may be contemplated by one of skill in the art.

As noted above, it may be useful in various instances to manage multiple seed types (e.g., seeds of different plant or plant-strain varieties, or seeds having different characteristics, qualities, and so on) during a particular planting operation. For example, it may be useful to plant different types of seed in different regions of a field, where the regions exhibit different characteristics with regard to soil conditions, pest or disease pressures, and so on. In order to avoid time-consuming manual switching of seed types each time the planting apparatus enters or leaves a particular field region, it may be useful to provide various methods and related devices for managing the corrupted and non-corrupted seed.

A multi-type seed management ("MTSM") method may provide various benefits relating to the management of multiple seed types. In certain implementations, an MTSM method may include filling a seed pool of a seed meter with first-type seed, operating the seed meter to deliver individual first-type seeds for planting, then, when a change in seed type is desired, evacuating the seed pool of the first-type seed. The seed pool may then be filled with second-type seed, the seed meter operated to deliver individual second-type seeds for planting, and, when another change in seed type is desired, the second-type seed evacuated from the seed pool. The seed pool may then be replenished with first-type seed and the cycle repeated as appropriate. In certain embodiments, a metering member or other seed-metering device may operate continuously during the various filling and evacuation operations. In certain embodiments, one or more supplemental chambers separated, at least in part, from the seed pool, may supply the metering member (or other device) with seed during (and after) an evacuation operation in order to ensure that the metering member provides a relatively uninterrupted flow of seed for planting even during changes between seed types.

Figure 1:
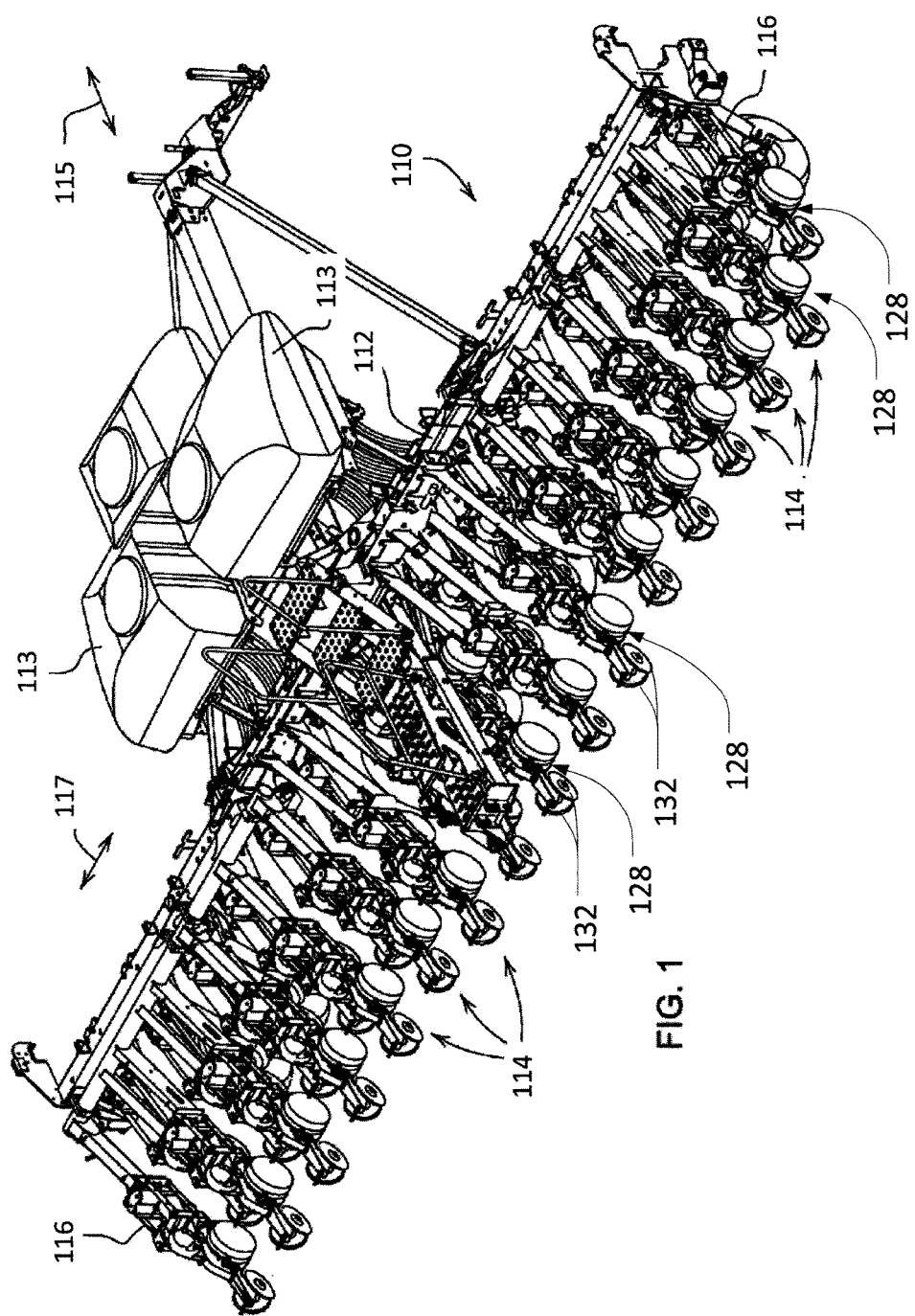
FIG. 1 is a perspective view of a common agricultural planter.

An MTSM method, or related valve, may be implemented with respect to a variety of seeding machines. Referring now to FIG. 1, example an agricultural seeding machine 110 is shown as a row crop planter. It will be understood that various other configurations may also be possible and that the disclosed MTSM method or seed valve may be used in a variety of agricultural machinery or other settings. The seeding machine 110 may include a central frame 112 on which a plurality of individual planting units 114 may be mounted. The seeding machine 110 may be oriented with a fore-aft direction shown by arrow 115 and a transverse direction shown by arrow 117. Each planting unit 114 may be coupled to the central frame 112 by a parallel linkage (e.g. the linkage 116) so that the individual planting units 114 may move up and down to a limited degree relative to the frame 112. Large storage tanks 113 (i.e., bulk storage containers) may hold seed that may be delivered pneumatically to a mini-hopper on each planting unit 114 in a known manner by a "seed on demand" delivery system such as shown in U.S. Pat. No. 6,688,244, which is incorporated herein by reference.

Figure 2:
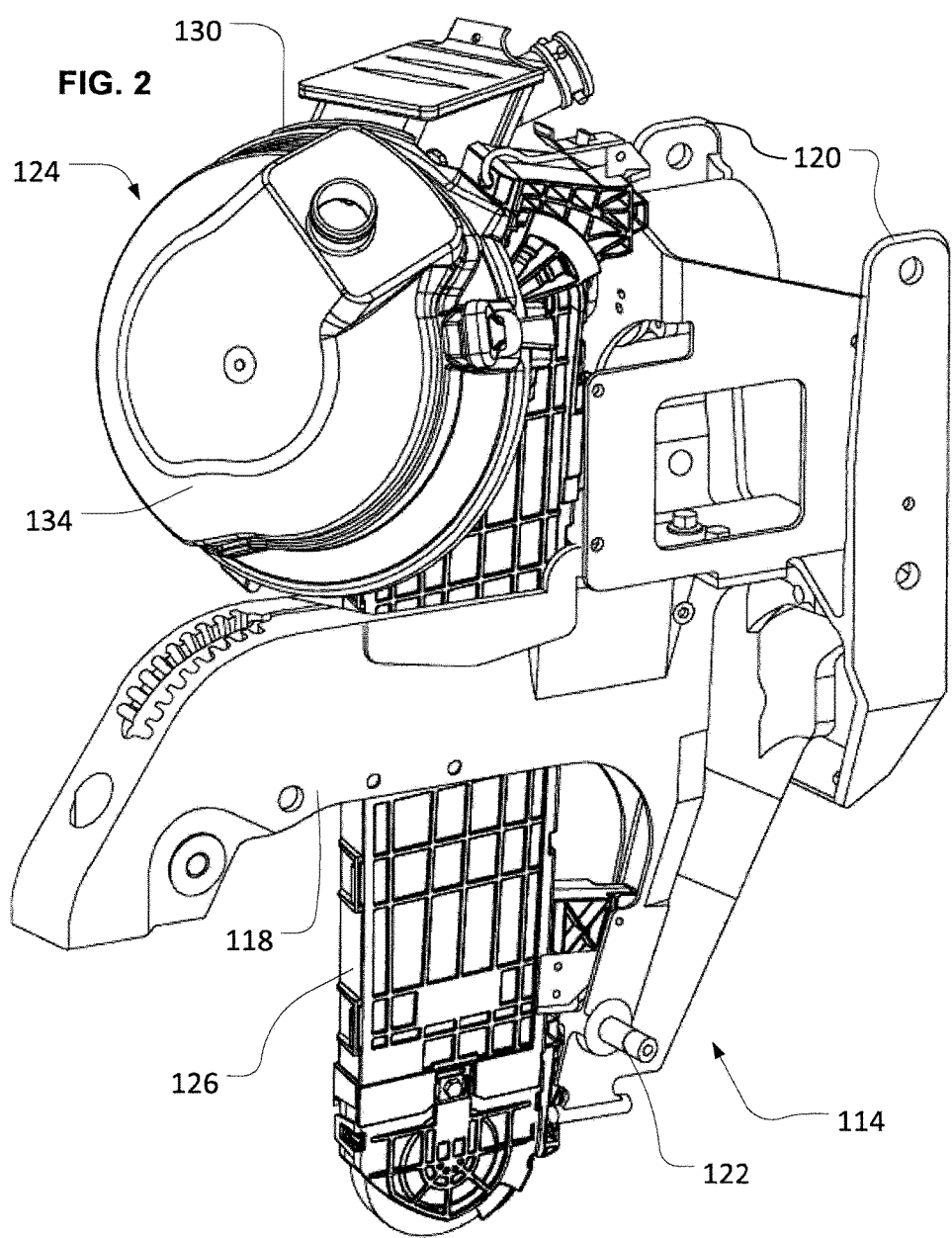
FIG. 2 is a side perspective view of a planting unit frame, seed meter and seed delivery system.

Referring also to FIG. 2, each planting unit 114 may include a frame member 118. (It will be understood that the disclosed conditioner may be utilized with the planting unit 114, or with various other seed-handling or other devices (not shown).) The frame member 118 may include a pair of upstanding arms 120 at the forward end thereof. The arms 120 may be coupled to the rearward ends of the parallel linkage 116. Furrow opening disks 128 (see FIG. 1) may be attached to a shaft 122 in a known manner to form an open furrow in the soil beneath the seeding machine into which seed is deposited. Closing and packing wheels 132 (see FIG. 1) may also be mounted to the frame member 118 in a known manner to close the furrow over the deposited seed and to firm the soil in the closed furrow. A seed meter 124 and seed delivery system 126 (depicted without a cover in FIG. 2) may also be attached to the frame member 118 of the planting unit.

Figure 3:
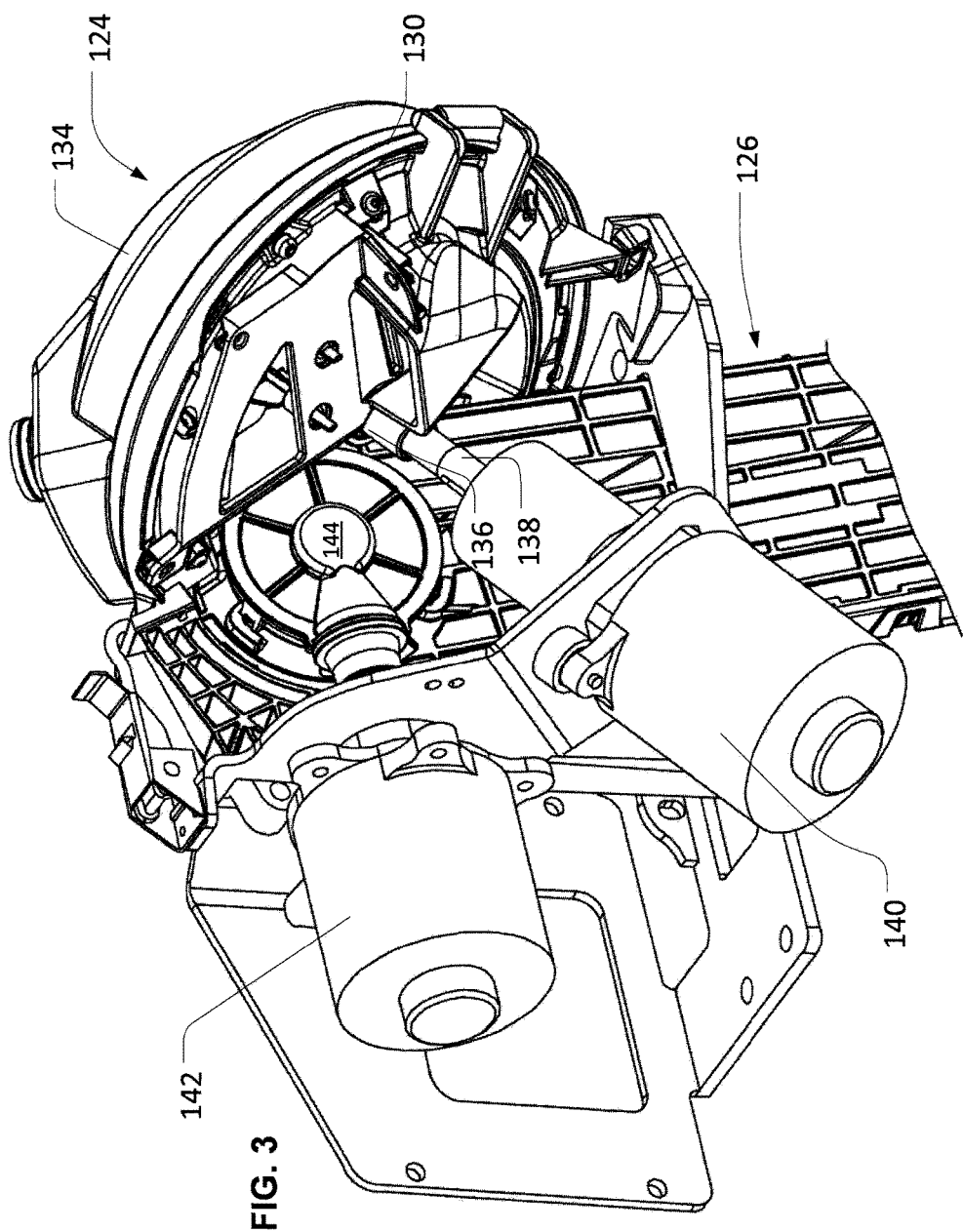
FIG. 3 is an enlarged perspective view of the seed meter and delivery system drives.
Figure 4:
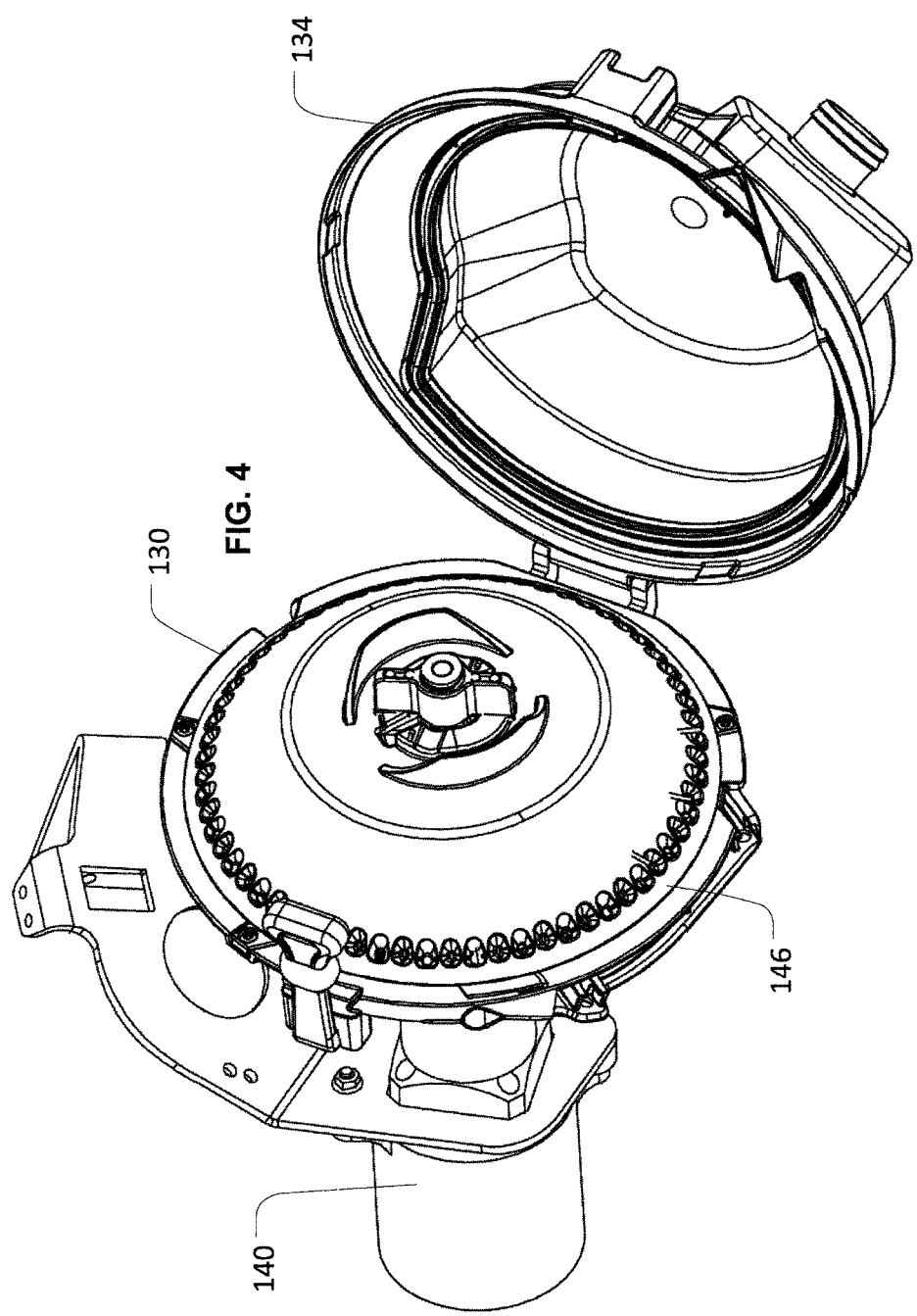
FIG. 4 is a perspective view of the seed meter with the cover open illustrating the metering member.

Referring also to FIGS. 3 and 4, the seed meter 124 may include a housing 130 and a cover 134. The housing 130 and the cover 134 may be coupled to one another by complementary hinge features on the housing 130 and the cover 134, respectively. A drive spindle 136 may be carried by the housing 130 and may be couple to an output shaft 138 of an electric motor 140, in order to drive the seed meter 124 when in the assembled position shown in FIG. 3.

The seed delivery system 126 may be driven by an electric motor 142. The output shaft of the motor 142 may be connected to the seed delivery system 126 through a right-angle drive 144. While electric motors have been shown to drive both the seed meter 124 and the seed delivery system 126, it will be appreciated by those skilled in the art that other types of motors, (e.g., hydraulic, pneumatic, and so on) can be used as well as various types of mechanical drive systems.

Figure 5:
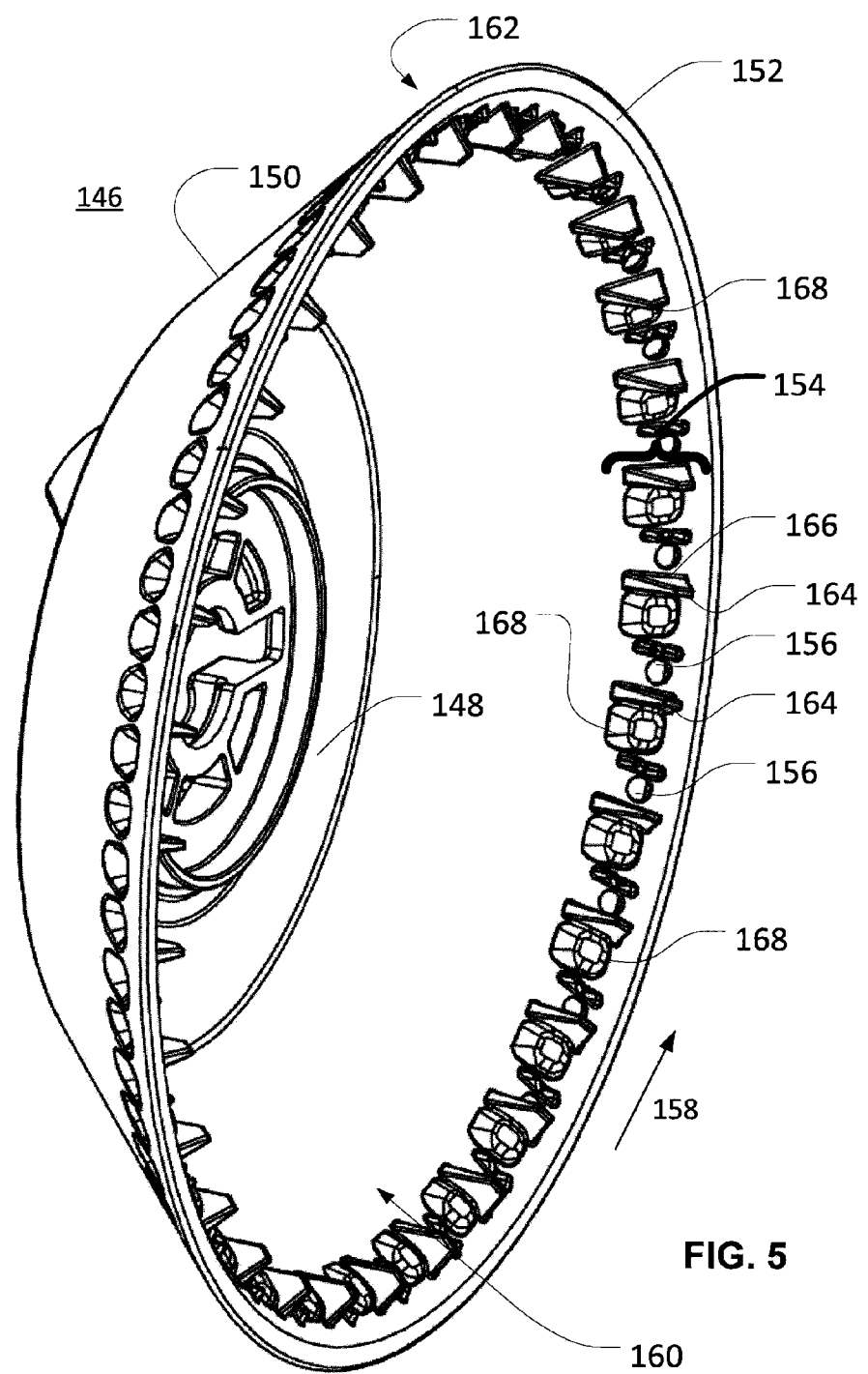
FIG. 5 is a perspective view of the metering member of FIG. 4.
Figure 6:
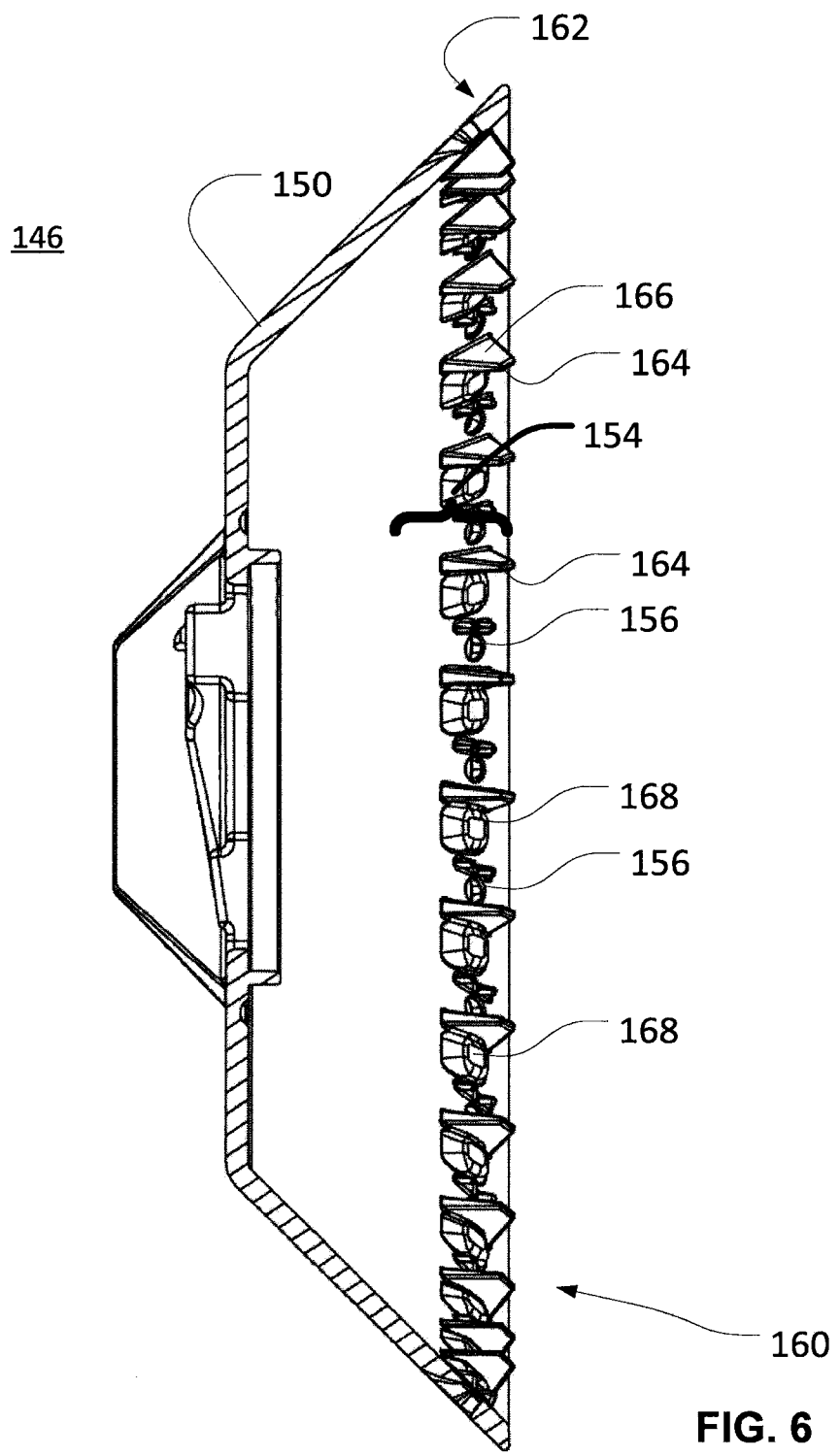
FIG. 6 is side cross-section of the metering member of FIG. 5 illustrating the orientation of the metering member installed in a seed meter mounted to a planting unit.
Figure 7:
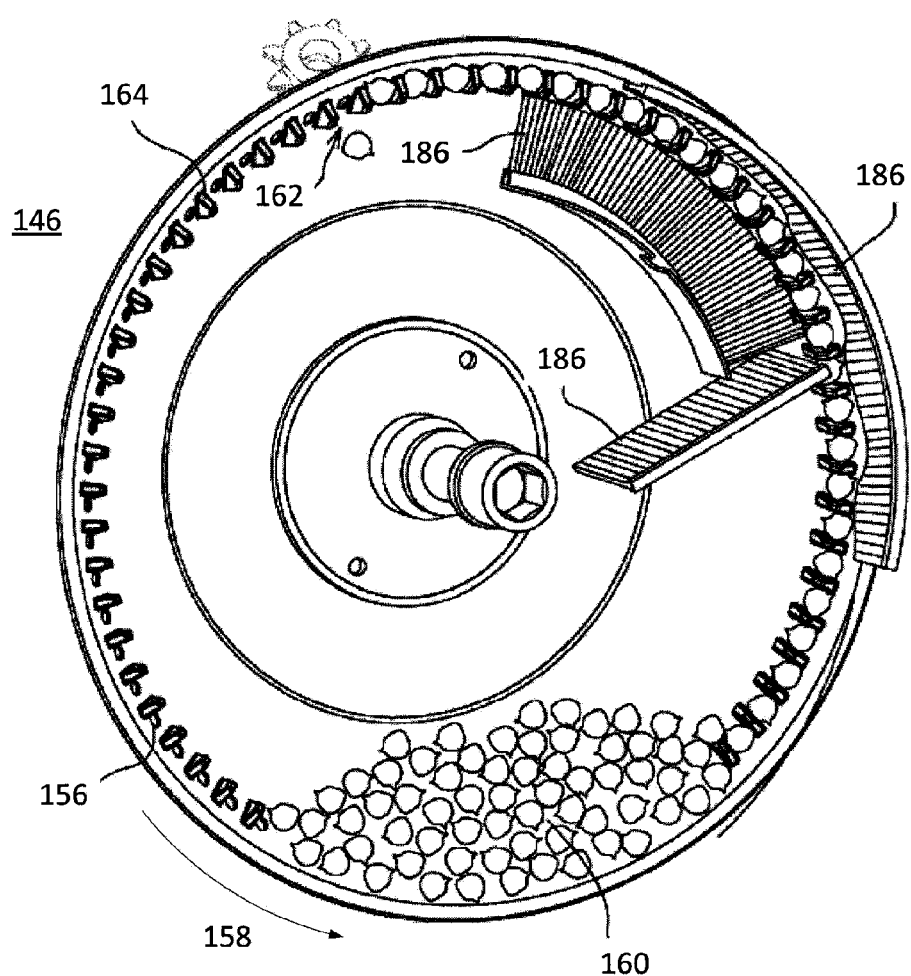
FIG. 7 is an elevational view of one embodiment of the inside of the metering member of FIG. 5.

Referring also to FIGS. 5 through 7, an example metering member 146 of the seed meter 124 is shown in greater detail. The metering member 146 may be (as shown) a concave bowl-shaped body. The bowl-shaped body may have a base portion 148 from which a side wall 150 extends. The side wall 150 may terminate in an outer edge 152. Adjacent the outer edge 152, the side wall 150 may include a rim portion 154, as indicated by brackets in FIGS. 5 and 6, which may extend radially outwardly and axially toward the outer edge 152. Within the rim portion 154, an annular array of apertures 156 may extend between the inner and outer surfaces of the side wall 150.

The metering member 146 may be mounted in the meter housing 130 for rotation in the direction of the arrow 158 in FIGS. 5 and 7. In operation, as the metering member rotates, individual seeds from a seed pool 160 located at a bottom portion of the metering member 146 may adhere to apertures 156 on the inner surface of the side wall 150 and thereby be sequentially carried upward to a release position 162 at an upper portion of the metering member 146. A series of raised features or projections, such as paddles 164, may extend from the inner surface of the side wall 150. In certain embodiments, one paddle 164 may be located behind each aperture 156, with respect to the direction of rotation, as shown by the arrow 158. Each paddle 164 may, accordingly, form a confronting surface 166 behind the associated aperture 156 in the direction of rotation to push a seed adhered to the aperture into the delivery system 126 as described below. In certain embodiments, the metering member 146, as installed in the housing 130, may be oriented at an angle from vertical (see FIG. 8).

As noted above, the seed pool 160 may formed near the bottom of the metering member 146. Vacuum may be applied to the outer surface of the side wall 150, causing individual seeds to be adhered to the various apertures 156 as the apertures 156 travel through the seed pool 160. As the metering member 146 rotates as shown by the arrow 158, seed may thereby be moved upward to the release position 162 at the upper portion of the metering member 146. The release position 162 may be slightly past the top or 12 o'clock position on the circular path of travel of the seed such that the seed is moving somewhat downward at the release position. The seed delivery system 126 may be positioned beneath the upper portion of the metering member 146 at the release position 162 to take the seed from the metering member 146 (e.g., as shown in FIG. 7).

In certain embodiments, as shown in FIG. 7, various brushes 186 or devices may be provided to assist in removing seed doubles from the seed meter 146, in retaining seeds within the seed pool 160, and so on. It will be understood that such brushes or devices may take various forms differing from those depicted in FIG. 7 (e.g., as in FIG. 36).

Figure 8:
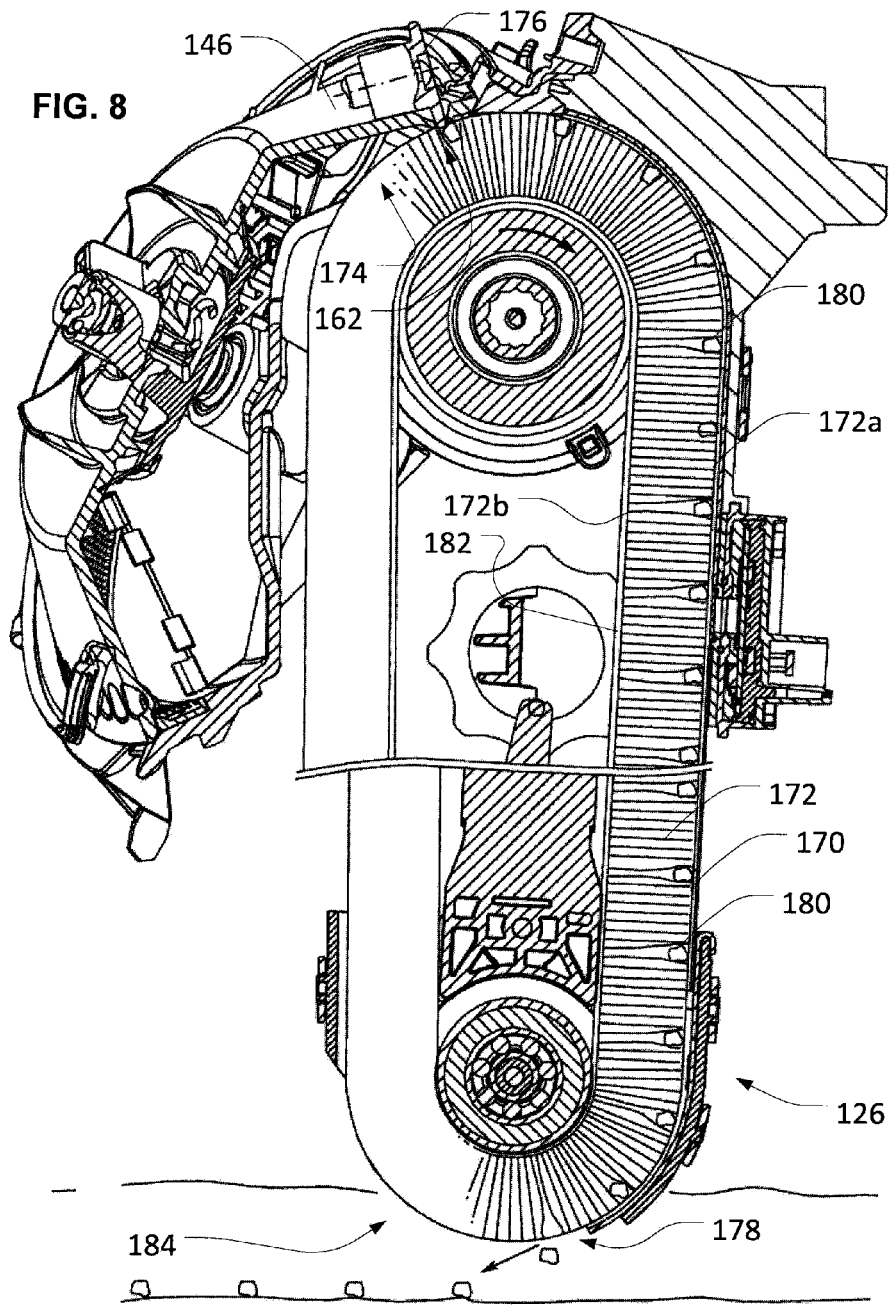
FIG. 8 is a side sectional view of one embodiment of the metering member and the seed delivery system of FIG. 2.

Referring also to FIG. 8, the delivery system 126 may include a housing 170 partially enclosing a brush belt 182 with bristles 172, which may generally travel in a clockwise direction (in FIG. 8) within housing 170. The bristles 172 may include attached ends 172b attached along the belt 182, with free ends 172a extending away from attached ends 172b. An upper opening 174 may be formed in the housing 170 in order to allow the seed 180 to enter the housing 170 (e.g., from the metering member 146). The free ends 172a of the bristles 172 may extend through the opening 174 in order to receive seed from the metering member 146. (It will be understood that other configurations may also be possible. For example, the delivery system 126 may be oriented horizontally, rather than vertically, or at various deviations from horizontal or vertical. As such, in a general sense, the opening 174 may be viewed as an inlet opening to the delivery system 126.) In certain embodiments, other transport mechanisms may be utilized, including non-brush belt delivery mechanisms, or others.

An ejector 176 may ride on the outer surface of the metering member 146, with projections from a star wheel on the ejector 176 extending, sequentially, into the apertures 156 in order to force seed out of the apertures 156. The ejector 176, which may be biased against the metering member 146 with a spring (not shown) may, accordingly, "walk" along the metering member 146 such that successive projections of the star wheel sequentially eject seeds, at the release position 162, from successive apertures 156. These ejected seeds may be captured by the free ends 172a of the bristles 172 and thereby carried along a path through the housing 170 to a seed ejection point 178 (as illustrated by the various seeds 180 in FIG. 8). At (and downstream of) the seed ejection point 178, the housing 170 may include an opening 184 to allow the free ends 172a of the bristles 172 to extend outside of the housing 170. This opening may provide an exit opening from the housing 170 for the seed 180 (i.e., at the ejection point 178).

Figure 9:
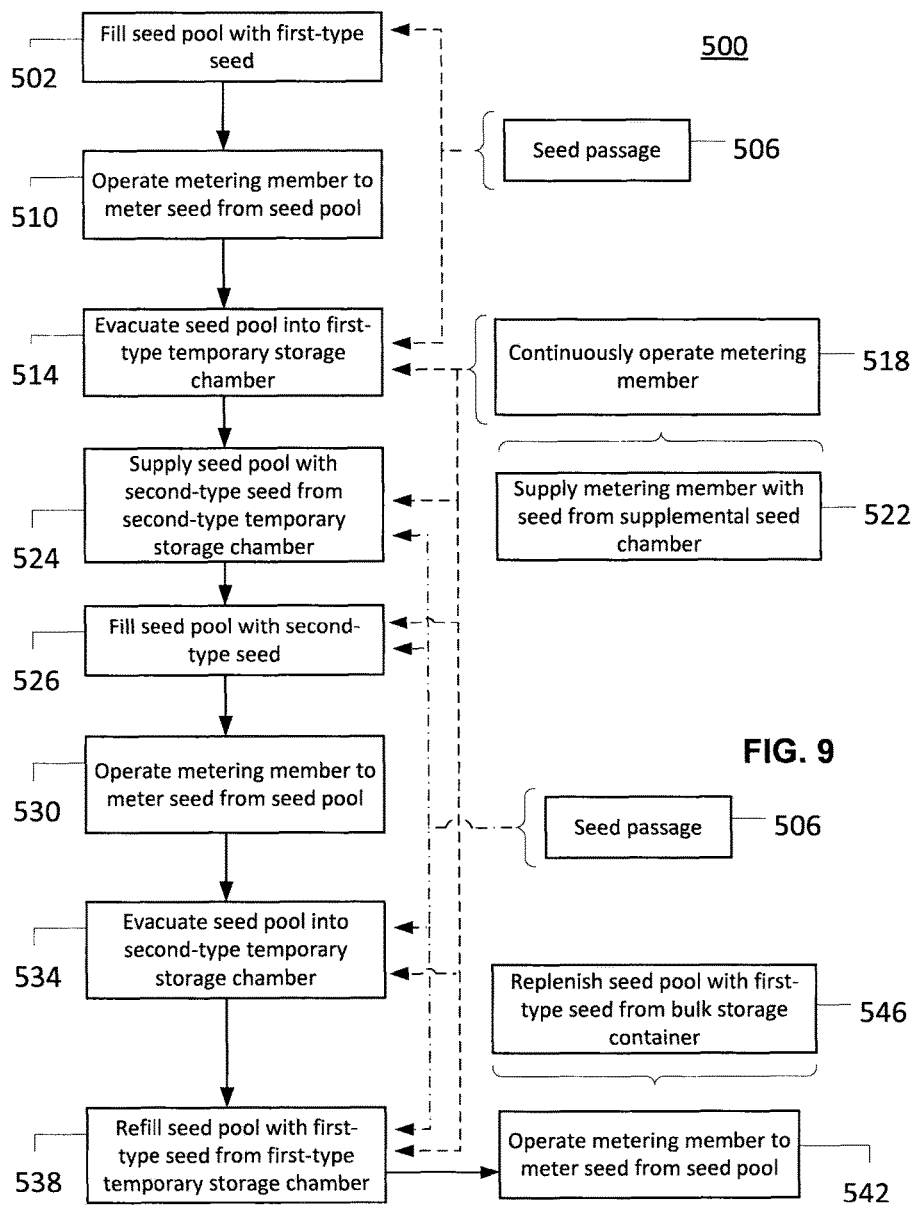
FIG. 9 is a schematic representation of a multi-type seed management method.

Referring now to FIG. 9, an MTSM method 500 may facilitate use of multiple seed types in a planting operation with a particular planting apparatus. In the example below, an example execution of the MTSM method 500 may be described with respect to the seeding machine 110. It will be understood, however, that various other planting or seed-transport devices may additionally (or alternatively) be utilized.

Under the MTSM method 500, a first type of seed may be loaded into certain of storage tanks 113 of the seeding machine 110 and may be delivered from the tanks 113 to individual planting units 114 of the seeding machine 110. The first-type seed may then be directed to a seed pool 160 within a seed meter 124 in order to fill 502 the seed pool 160. It will be understood that the volume or number of first-type seeds utilized to fill 502 a seed pool may vary depending on seed and seed pool characteristics, operating conditions, the particular machinery utilized, and so on. In certain implementations, the first-type seed may be directed to the seed pool 160 through a particular seed passage 506, which may be associated with a seed valve of various configurations (as discussed in greater detail below).

The metering member 146 of the seed meter 124 (or a similar device) may then operate 510 to meter the first-type seed from the seed pool 160 and thereby deliver the seed for planting (e.g., by seed delivery system 126). For example, as described in greater detail above, the metering member 146 may rotate through the seed pool 160 and thereby carry seed from the seed pool 160 to the seed delivery system 126 for planting.

When a change to a different seed type is desired (e.g., as determined by identification of a location of the seeding machine 110 within a field), the first-type seed may be evacuated 514 from the seed pool 160. In certain implementations, the first-type seed may be evacuated 514 from the seed pool 160 into a temporary storage chamber for the first-type seed (e.g., a chamber associated with a seed valve). In certain implementations, the first-type seed may be evacuated 514 from the seed pool 160 through the same seed passage 506 used to fill 502 the seed pool 160.

It will be understood that "evacuate" as used herein may not necessarily connote the complete removal of a particular seed type from a location. Rather, "evacuate" may indicate simply that some number of seeds are removed from the location other than for immediate planting.

During the evacuation 514 of the first-type seed, the metering member 146 may continue to operate 518. This may be useful, for example, in order to ensure continuous delivery of seed to seed delivery system 126 for planting, even during transition between different seed types. To this end, in certain implementations, seed (e.g., first-type seed) may be supplied 522 to the operating 518 metering member 146 from a supplemental seed chamber. For example, a supplemental seed chamber that is distinct from the primary seed pool 160 may be provided within the seed meter 124 such that when the seed pool 160 is evacuated 514, seed may be carried by the metering member 146 from the supplemental seed chamber to the seed delivery system 126 for planting.

After the first-type seed has been appropriately evacuated 514 from the seed pool 160, the seed pool may be filled 526 with second-type seed. For example, a second type of seed may be loaded into certain other large storage tanks 113 of the seeding machine 110 and may be delivered from the other tanks 113 to individual planting units 114 of the seeding machine 110. The second-type seed may then be directed to the seed pool 160 within the seed meter 124 in order to fill 526 the seed pool 160. It will be understood that the volume or number of second-type seeds utilized to fill 526 a seed pool may vary depending on seed and seed pool characteristics, operating conditions, the particular machinery utilized, and so on. In certain implementations, the second-type seed may be directed to the seed pool 160 through a particular seed passage, which may be the same seed passage 506 used to fill 502 the seed pool 160 with first-type seed and also, potentially, to evacuate 514 the first-type seed from the seed pool 160.

The metering member 146 of the seed meter 124 (or a similar device) may then operate 530 to meter seed from the seed pool 160 and thereby deliver the seed for planting (e.g., by seed delivery system 126). For example, as described in greater detail above, the metering member 146 may rotate through the seed pool 160 and thereby carry seed from the seed pool 160 to the seed delivery system 126 for planting.

In certain embodiments, before being filled 526 with second-type seed from large storage tanks 113 (or other bulk storage systems), the seed pool may be supplied 524 with second-type seed from a temporary storage chamber. For example, after the evacuation 514 of first-type seed from the seed pool 160 into the first-type temporary storage chamber, second-type seed may be supplied 524 to the seed pool 160 from a separate second-type temporary storage chamber (e.g., which was previously manually or automatically filled with second-type seed). In this way, the seed pool 160 may be "primed" with second-type seed a relatively short time after the evacuation 514 of the first-type seed, in order to further facilitate the continuous operation 518 of the seed meter. After this initial supplying 524 of second-type seed from the second-type temporary storage chamber, the seed pool 160 may then be filled 526 with second-type seed from the storage tanks 113 (or various other sources). In certain embodiments, second-type seed may be supplied 524 to the seed pool 160 from the second-type temporary storage chamber via the same seed passage 506 used for various other filling or supply operations of the MTSM method 500.

When a change to a different seed type is desired (e.g., as determined by identification of a location of the seeding machine 110 within a field), the second-type seed may be evacuated 534 from the seed pool 160. In certain implementations, the second-type seed may be evacuated 534 from the seed pool 160 into a temporary storage chamber for the second-type seed (e.g., a chamber associated with a seed valve), which may be a distinct chamber from the first-type temporary storage chamber noted above. In certain implementations, the second-type seed may be evacuated 534 from the seed pool 160 through the same seed passage 506 used to fill 526 the seed pool 160.

During the evacuation 534 of the second-type seed, the metering member 146 may continue to operate 518. This may be useful, for example, in order to ensure continuous delivery of seed to seed delivery system 126 for planting, even during transition between different seed types. To this end, in certain implementations, seed (e.g., second-type seed) may be supplied 522 to the operating 518 metering member 146 from a supplemental seed chamber. For example, a supplemental seed chamber that is distinct from the primary seed pool 160 may be provided within the seed meter 124 such that when the seed pool 160 is evacuated 514, seed may be carried by the metering member 146 from the supplemental seed chamber to the seed delivery system 126 for planting.

After the second-type seed has been appropriately evacuated from the seed pool 160, the seed pool may be then be refilled 538 with first-type seed (e.g., through seed passage 506). The metering member 146 may continuously operate 518 throughout the refilling 538 operation to provide a steady stream of seed to the seed delivery system 126, and may continue to operate 542 after the refilling 538 operation in order to meter the first-type seed from the seed pool 160.

In certain implementations, MTSM method 500 and various similar methods may be executed automatically. For example, one or more specialized computing systems, mechanical or other timing systems (e.g., various systems of timing gears, cams, and so on) or other devices may be utilized to control various functionality of the method 500. In certain implementations MTSM method 500 and various similar methods may be executed based upon, at least in part, operator input. For example, various functionality of the method 500 may be triggered by an operator command (e.g., as entered at a control screen in a tractor cab (not shown)) or other input.

In certain implementations, an MTSM method (e.g., method 500) may be implemented, at least in part, by various specialized seed valves. Such seed valves may include, for example, various movable control openings in communication with various fixed openings, seed passages, and seed storage chambers. By moving certain of the movable control openings into and out of alignment with other openings, flow passages for seeds between particular storage chambers, seed inlets, seed outlets, seed pools, and so on may be selectively opened and closed. In this way, the flow of seed into (and out of) a seed meter from (and to) various compartments and passages may be controlled.

As used herein, "aligned," "physically aligned," "generally aligned," and the like may indicate a physical overlap of components, but not necessarily a complete physical overlap of components. For example, two openings may be viewed as "aligned" if the openings physically overlap at least in part with respect to a flow path through the openings. With respect to flow of particular seed through openings, such openings may be viewed as "aligned" when the openings overlap to the extend that the particular seed may pass through both openings.

Where "physically" or "generally," or no qualifying adjective is used, "aligned" features may be considered as physically overlapping, as described above. To further simplify notation, however, "aligned" may also be utilized to indicate the overlapping of geometric projections of various features. For example, as used herein, two features may be viewed as "angularly aligned" if the features are oriented at the same angle or "o'clock" position, with respect to a reference axis. As such, for example, one feature on a first cylinder nested concentrically with a second cylinder may be viewed as angularly aligned with another feature on the second concentric cylinder if the two features fall, at least in part, at the same "o'clock" orientation on the respective circumferences of cylinders, even if the two features do not physically overlap (e.g., even if one feature is axially removed from the other). Similarly, two features may be viewed as "axially aligned" if the features are oriented at the same location axially along one or more bodies, with respect to a reference location. As such, for example, for the two features on concentric cylinders noted above, the first feature may be viewed as axially aligned with the second feature if both features fall, at least in part, at the same axial distance along the cylinders from a reference point.

Referring also to FIGS. 10-16, for example, the structure and operation of an example seed valve 600 is depicted. Such a seed valve 600 may be useful for executing an MTSM method or various other functionality.

Referring in particular to FIG. 11, the seed valve 600 may generally include a valve body 602, which may be formed from molded plastic, metal, or various other materials. As depicted, the valve body 602 may include a generally conical upper portion 602a with a temporary storage chamber separator 622, which may collectively define a first-type temporary storage chamber 618 and a second-type temporary storage chamber 620. The valve body 602 may also include a first-type seed inlet 604 and a second-type seed inlet 608 (e.g., separate cylindrical seed ducts), which may be connected by various seed lines (not shown) to various of the large storage tanks 113 (FIG. 1) or other seed receptacles (not shown). First-type seed inlet 604 may open within the valve body 602 into first-type inlet chamber 606 and second-type seed inlet 608 may open within the valve body 602 into second-type inlet chamber 610. The inlet chambers 606 and 610 may be separated from each other by inlet chamber separator 612 and from the temporary storage chambers 618 and 620 by an extension of the conical upper portion 602a of the valve body 602. The first-type seed inlet 604 may be in communication with a storage tank 113 holding first-type seed, and the second-type seed inlet 608 may be in communication with another storage tank 113 holding second-type seed.

A valve passage 628 may extend longitudinally within the valve body 602 between ends 628a and 628b. As depicted, the valve passage 628 may be a single tubular passage, having a cylindrical portion of the valve passage 628 oriented along a centerline of the valve body 602. Other configurations may be possible, however, including configurations having multiple passages 628, passages 628 with other geometry, one or more passages 628 divided into separate internal flow channels, or passages 628 oriented differently within (or around) the valve 600.

At the end 628b the valve passage 628 may connect (directly or indirectly) to a seed passage 630. The seed passage 630 may include a seed duct (or ducts) of various configurations (e.g., a single-passage duct, a duct divided into multiple internal passages, and so on) and may generally provide a conduit for seed between the seed valve 600 and a seed pool (e.g., the seed pool 160 of the seed meter 124). At the end 628a the valve passage 628 may be open or closed.

In certain embodiments, a vacuum may be applied to the seed valve 600 near the end 628a of the valve passage 628. For example, a vacuum dome (not shown) may surround the end 628a of the valve passage 628 and generally provide a seal with the upper portion of valve body 602. Such a vacuum dome may be in communication with a vacuum source (not shown) and may provide an appropriate seal with the valve body 602 for the vacuum to be maintained within the valve body 602. In certain embodiments, the vacuum source may apply a vacuum continuously. In certain embodiments, the vacuum source may apply a vacuum only as needed. (It will be understood that "vacuum," as used herein, may generally describe a reduction in pressure with respect to the surroundings, whether or not a complete vacuum is achieved.)

The valve passage 628 may include various openings, which may be utilized to control the flow of seed within the seed valve 600. As depicted in FIG. 11, for example, the valve passage 628 may include first-type temporary storage inlet 638, first-type temporary storage outlet opening 640 and first-type primary feed opening 642. As depicted, the first-type temporary storage inlet 638 may be angularly aligned with and generally above (i.e., axially removed from) the first-type temporary storage chamber 618, the first-type temporary storage outlet 640 may be oriented generally within (i.e., angularly aligned with) and near the bottom of the first-type temporary storage chamber 618, and the first-type primary feed opening 642 may be oriented within the first-type inlet chamber and generally below the first-type seed inlet 604. Similarly, as depicted in FIG. 13, the valve passage 628 may include second-type temporary storage inlet 646, second-type temporary storage outlet opening 648 and second-type primary feed opening 650. As depicted, the second-type temporary storage inlet 646 may be angularly aligned with and generally above (i.e., axially removed from) the second-type temporary storage chamber 620, the second-type temporary storage outlet 648 may be oriented generally within (i.e., angularly aligned with) and near the bottom of the second-type temporary storage chamber 620, and the second-type primary feed opening 650 may be oriented within the second-type inlet chamber and generally below the second-type seed inlet 608.

Also to control the flow of seed within the seed valve 600, a movable valve member 654 (depicted in isolation in FIG. 10) may be oriented within the valve passage 628. In certain embodiments, the valve member 654 may be in communication with one or more motors or other power sources (not shown) which may be utilized to controllably rotate the valve member 654. As depicted, the valve member 654 may be a generally cylindrical tubular member with a unified internal passage. Other configurations may be possible, however, including configurations having other geometry, multiple internal passages (e.g., different internal passages for different seed types), and so on.

The valve member 654 may include various control openings, which may be distributed at various axial and peripheral locations on the valve member 654. As depicted most clearly in FIG. 10, for example, the valve member 654 may include a temporary storage inlet control opening 656, a temporary storage outlet control opening 658 and a primary feed control opening 660. In the configuration depicted, the temporary storage inlet control opening 656 may be axially aligned with the first-type and second-type storage inlet openings 638 and 646 (see FIGS. 12 and 15) when the valve member 654 is appropriately nested within the valve passage 628. Similarly, the temporary storage outlet control opening 658 may be axially aligned with the first-type and second-type storage outlet openings 640 and 648 (see FIGS. 13 and 16), and the primary feed control opening 660 may be axially aligned with the first-type and second type primary feed openings 642 and 650 (see FIGS. 11 and 14).

Figure 10:
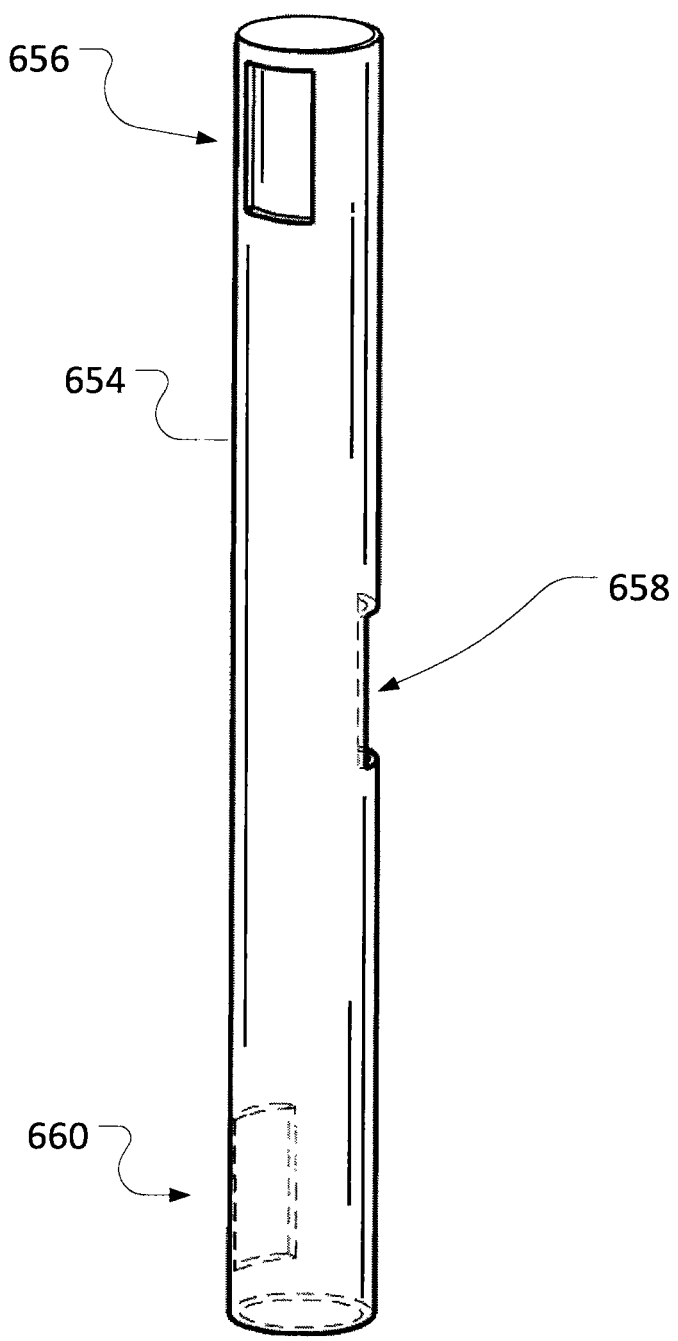
FIG. 10 is a perspective view of a valve member for a seed valve.

In certain embodiments, the various openings noted above (or others) may be configured so that when one of the control openings 656, 658 or 660 (or another control opening) is aligned with one of the valve passage openings 638, 640, 642, 646, 648, or 650 (or another valve passage opening), none of the other control openings is also aligned with a valve passage opening. As depicted in FIG. 10, for example, no control opening 656, 658 or 660 angularly aligns with another and no control opening 656, 658, or 660 occupies a portion of the valve member 654 that is diametrically opposite another control opening 656, 658, or 660. In certain embodiments, however, the various openings may be configured so that multiple control and valve passage openings may simultaneously align.

An example operation of the seed valve 600 to control planting of two seed types will now be described. It will be understood that similar structure and operation may be employed, in other embodiments, to control the planting of a different number of seed types (e.g., three or more seed types). In the operation depicted in FIGS. 11-16, the valve member 654 may be considered as executing stepped, counterclockwise rotation (from a perspective looking down from the vacuum source). It will be understood, however, that alternative rotation or other movement may be possible. The flow path of seeds in FIGS. 11-16 is indicated with block arrows.

Referring in particular to FIG. 11, a seeding cycle for the seed valve 600 may begin with first-type seed flowing through inlet 604 (e.g., from an associated hopper or from storage tanks 113). The valve member 654 may be rotated (e.g., by a stepper motor (not shown)) to a first position, such that the primary feed control opening 660 aligns with the first-type primary feed opening 642. Accordingly, a flow passage through the openings 660 and 642 may be provided and the first-type seed may flow from the inlet 604, through the first-type inlet chamber 606 and the openings 660 and 642, and into the seed passage 630. With the seed passage 630 in communication with the seed pool 160, the seed pool 160 may accordingly be filled 502 with first-type seed and the metering member 146 may operate 510 to meter the first-type seed for planting. As seed from the seed pool 160 is consumed (i.e., is metered by the seed meter 124 for planting), first-type seed from a relevant storage tank 113 may be supplied to the first-type inlet 604 in order to ensure that an appropriate amount of seed is supplied to the seed pool 160.

After some amount of time of operation 510 of the metering member 146, it may be appropriate to transition from first-type seed to second-type seed. For example, a GPS-enabled controller (not shown) may determine that the seeding machine 110 is about to enter a portion of the field in which second-type seed is to be planted, an operator may indicate in various ways that planting of second-type seed should begin, or various other mechanisms or devices may determine that a change between seed types may be appropriate. At this time, because it may be undesirable to mix different seed types in the seed pool 160, it may be appropriate to evacuate 514 the first-type seed from the seed pool 160. To facilitate this evacuation 514, referring in particular to FIG. 12, the valve member 654 may be rotated to a second position, such that the opening 660 is no longer aligned with the primary feed opening 642, in order to stop the flow of first-type seed from the storage tank 114 into the seed pool 160, and such that the temporary storage inlet control opening 656 aligns with the first-type temporary storage inlet opening 638. Accordingly, a flow passage through the openings 638 and 656 may be provided.

With this flow passage now extending from the seed pool 160 to the first-type temporary storage chamber 618, via the seed passage 630, the valve member 654, and the openings 638 and 656, vacuum applied to the seed valve 600 by the vacuum source (not shown), may cause first-type seed to flow from the seed pool 160 into the first-type temporary storage chamber 618. For example, the vacuum applied to the seed valve 600 may create a pressure differential between the interior of the seed valve 600 and the seed pool 160, thereby drawing air and seed at a relatively high velocity out of the seed pool 160, through the seed passage 630, the valve passage 628 and valve member 654, and out of the openings 638 and 656. When the air and the seed enter the larger area of the seed valve 600 outside of the valve member 654 (i.e., the area above the first-type temporary storage chamber 618), the relative increase in flow area may correspond to a relative decrease in air and seed velocity. Accordingly, while the air may continue on to the vacuum source, the seed may not retain sufficient velocity to sustain its upward travel and may drop into the first-type temporary storage chamber 618.

Figure 36:
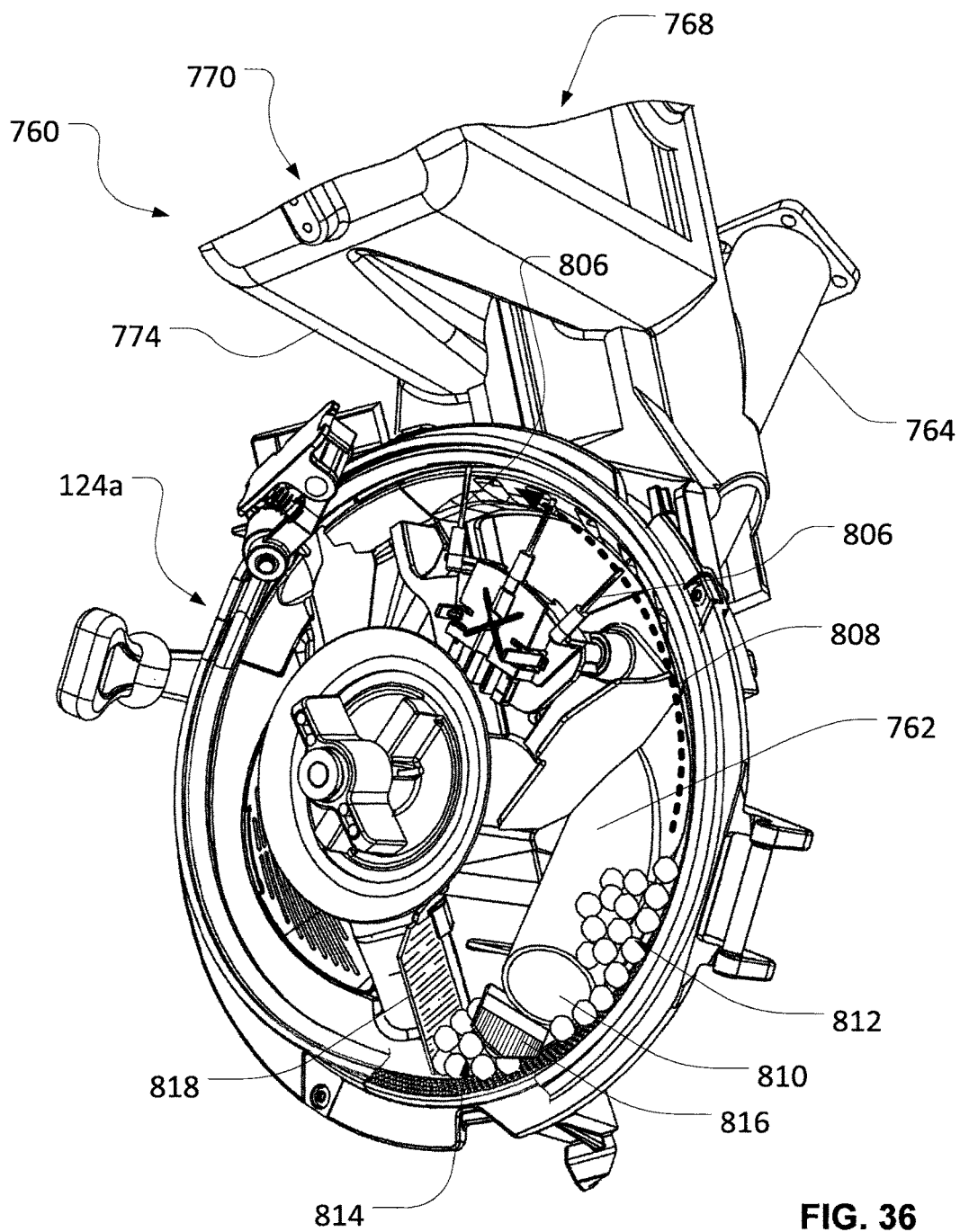
FIG. 36 is a perspective view showing an example arrangement of internal components of the seed meter of FIGS. 29 and 30.

With the first-type seed appropriately evacuated 514 from the seed pool 160, the metering member 146 may be supplied 522 with first-type seed from the supplemental seed chamber (as depicted, for example, in FIG. 36. This may allow the metering member 146 to continuously operate 518 to deliver seed for planting, even after the evacuation 514 of first-type seed from the seed pool 160.

Shortly after the completion of the evacuation 514 of the first-type seed from the seed pool 160 the seed pool may be supplied 524 with second-type seed from the second-type temporary storage chamber 620. Referring in particular to FIG. 13, the valve member 654 may be rotated to a third position, such that the temporary storage outlet control opening 658 aligns with the second-type temporary storage outlet opening 648. Accordingly, a flow passage through the openings 648 and 658 may be provided, and the second-type seed may flow from the second-type temporary storage chamber 620, through the openings 648 and 658, and through the valve member 654 and the valve passage 628 to the seed passage 630. With seed passage 630 in communication with the seed pool 160, the seed pool 160 may accordingly be supplied 524 with second-type seed and the second-type seed may be metered by the continuously operating 518 metering member 146 for planting.

As described in greater detail below, the seed valve 600 may execute a relatively continuous cycle, which may include evacuating 534 second-type seed from the seed pool 160 into the second-type temporary storage chamber 620. If the second-type temporary storage chamber 620 has already been filled by such an evacuation 534 of the seed pool 160, the second-type seed supplied 524 from the second-type temporary storage chamber 620 to the seed pool 160 may be the same second-type seed that was previously evacuated 534 from the seed pool 160 into the second-type temporary storage chamber 620. In other cases, second-type seed 160 may be otherwise provided to the second-type temporary storage chamber 620. For example, the second-type temporary storage chamber 620 may be pre-filled manually or automatically with an initial supply of second-type seed in various ways.

With the seed meter 124 appropriately "primed" by the supply 524 of second-type seed from the second-type temporary storage chamber 620, the seed pool 160 may then be filled 526 with second-type seed from an associated hopper (or storage tanks 113). Referring in particular to FIG. 14, for example, the valve member 654 may be rotated to a fourth position, such that the primary feed control opening 660 aligns with the second-type primary feed opening 650. Accordingly, a flow passage through the openings 660 and 650 may be provided and the second-type seed may flow from the second-type inlet 608, through the second-type inlet chamber 610 and the openings 660 and 650, and into the seed passage 630. With the seed passage 630 in communication with the seed pool 160, the seed pool 160 may accordingly be filled 526 with second-type seed and the metering member 146 may operate 542 to meter the second-type seed for planting. As seed from the seed pool 160 is consumed (i.e., is metered by the seed meter 124 for planting), second-type seed from a relevant storage tank 113 may be supplied to the second-type inlet 608 in order to ensure that an appropriate amount of seed is supplied to the seed pool 160.

After some amount of time of operation 542 of the metering member 146, it may be appropriate to transition from second-type seed back to first-type seed. Therefore, it may be appropriate to evacuate 534 the second-type seed from the seed pool 160. To facilitate this evacuation 534, referring in particular to FIG. 15, the valve member 654 may be rotated to a fifth position, such that the temporary storage inlet control opening 656 aligns with the second-type temporary storage inlet opening 646. Accordingly, a flow passage through the openings 646 and 656 may be provided, and, due to the vacuum applied by the vacuum source, second-type seed may flow from the seed pool 160, through the seed passage 630 and the valve passage 628 and the valve member 654, out the openings 646 and 656, and into the second-type temporary storage chamber 620.

As described above with regard to the evacuation 514 of first-type seed from the seed pool 160, the vacuum applied to the seed valve 600 may create a pressure differential between the interior of the seed valve 600 and the seed pool 160, thereby drawing air and seed at a relatively high velocity out of the seed pool 160, through the seed passage 630, the valve passage 628 and valve member 654, and out of the openings 646 and 656. When the air and the seed enter the larger area of the seed valve 600 outside of the valve member 654 (i.e., the area above the second-type temporary storage chamber 620), the relative increase in flow area may correspond to a relative decrease in air and seed velocity. Accordingly, while the air may continue on to the vacuum source, the seed may not retain sufficient velocity to sustain its upward travel and may drop into the first-type temporary storage chamber 620

As the second-type seed is evacuated 534 from the seed pool 160, the metering member 146 may be supplied 522 with second-type seed from the supplemental seed chamber to facilitate continuous operation 518 of the seed meter 124. The seed pool may then be refilled 538 with first-type seed. Referring in particular to FIG. 16, for example, the valve member 654 may be rotated to a sixth position such that the temporary storage outlet control opening 658 aligns with the first-type temporary storage outlet 640. Accordingly, a flow passage through the openings 640 and 658 may be provided, and the first-type seed may flow from the first-type temporary storage chamber 618, through the openings 640 and 658, and through the valve member 654 and the valve passage 628 to the seed passage 630. With seed passage 630 in communication with the seed pool 160, the seed pool 160 may accordingly be refilled 538 with first-type seed and the first-type seed may be metered by the operating 542 metering member 146 for planting.

With the seed meter 124 appropriately "primed" by the refilling 538 operation, the cycle may then repeat. For example, the valve member 654 may be rotated such that the primary feed control opening 660 again aligns with the first-type primary feed opening 642 (see FIG. 11), and the seed pool 160 may be appropriately replenished 546 with first-type Seed.

Figure 17:
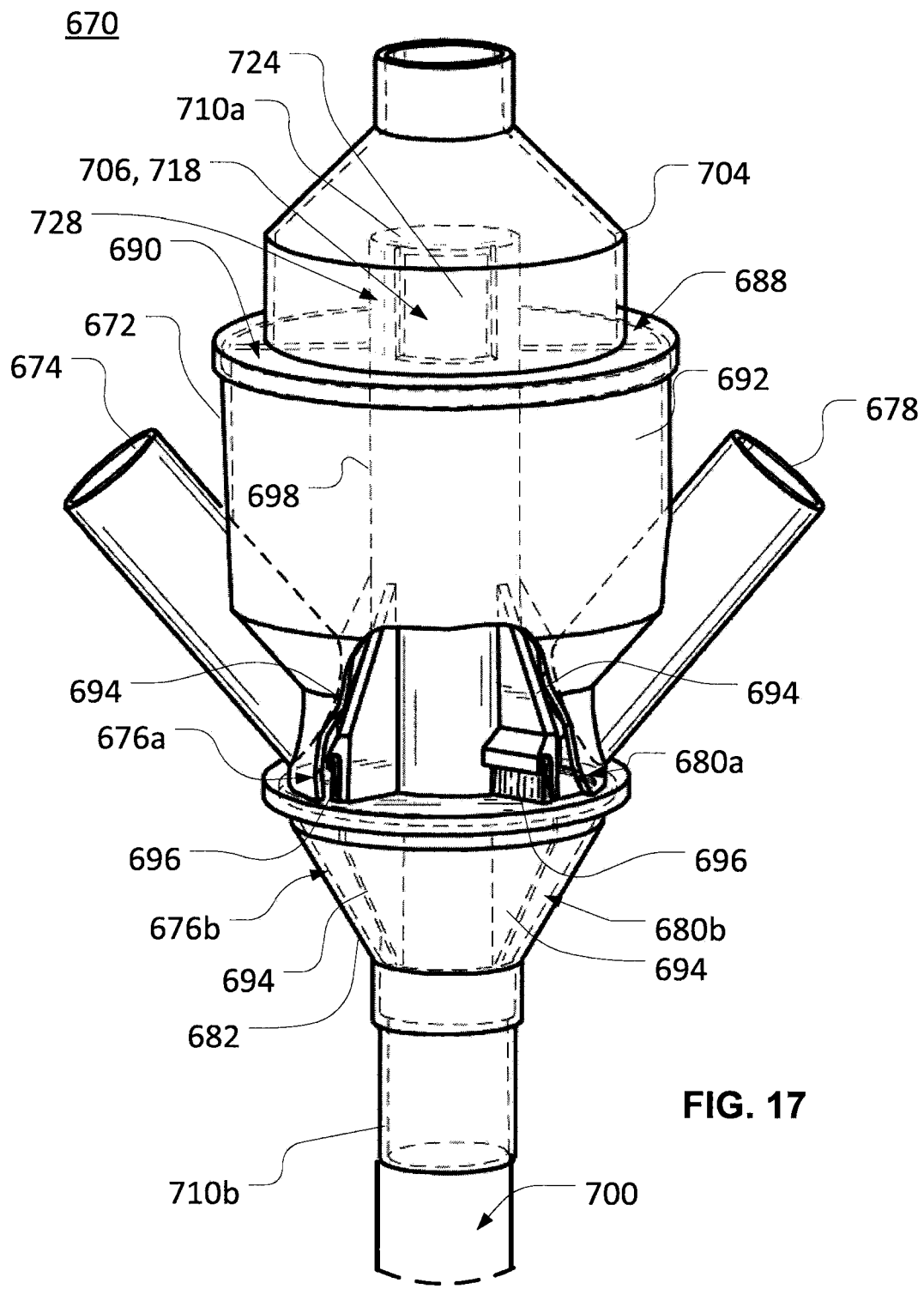
FIG. 17 is a perspective view of another example seed valve for multiple seed types.
Figure 18:
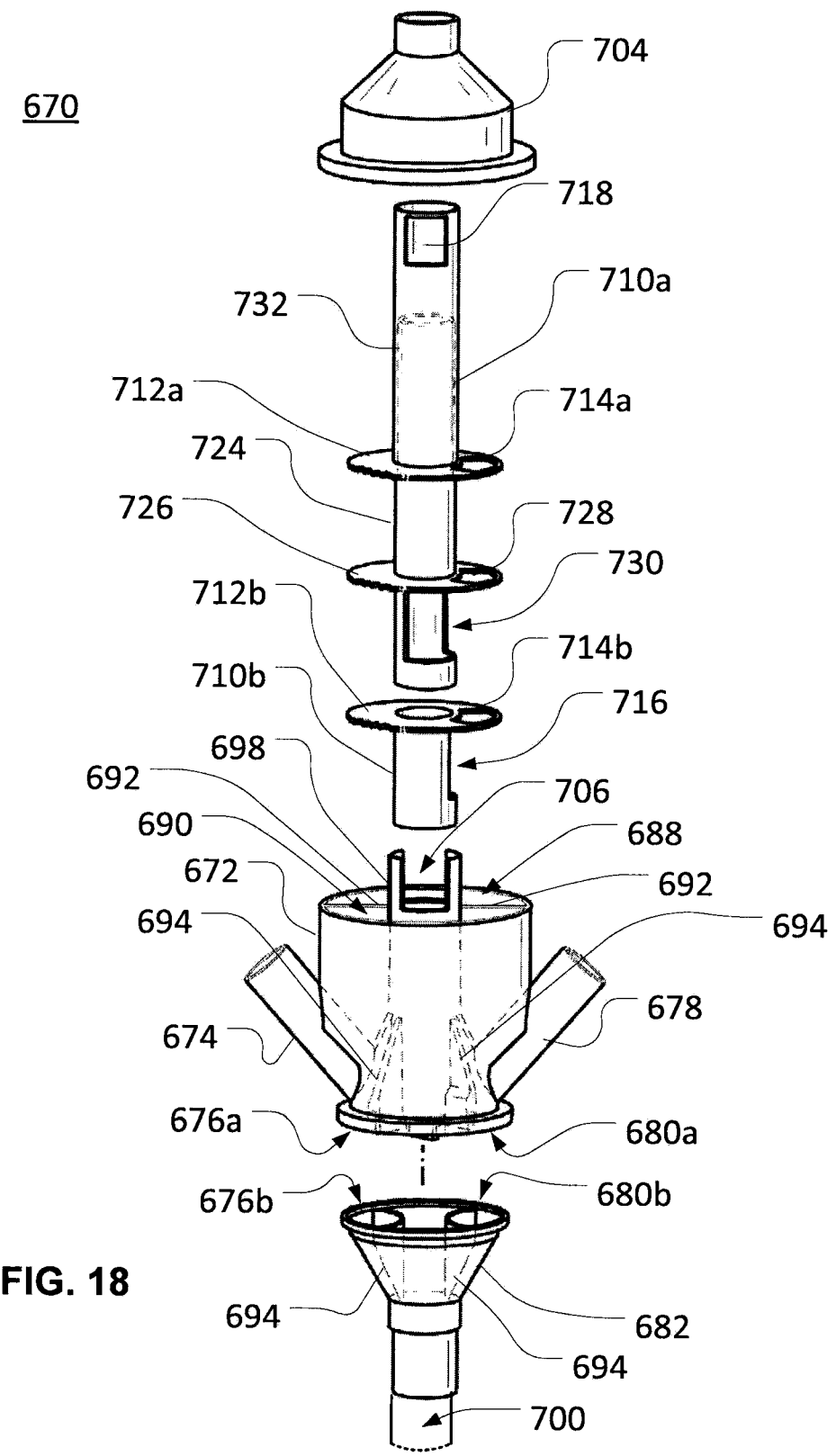
FIG. 18 is an exploded perspective view of the seed valve of FIG. 17.

Various other seed valve configurations may similarly facilitate the operations of an MTSM method or other functionality. Referring to FIGS. 17 and 18, for example, seed valve 670 may generally include a generally cylindrical valve body 672, which may be formed from molded plastic, metal, or various other materials. The valve body 672 may include a temporary storage chamber separator 692, which may separate a first-type temporary storage chamber 688 from a second-type temporary storage chamber 690 within the valve body 672. The valve body may also include first-type seed inlet 674 and second-type seed inlet 678 (e.g., cylindrical seed ducts), which may be connected by various seed lines (not shown) to various of the large storage tanks 113 (FIG. 1) or other seed receptacles (not shown). First-type seed inlet 674 may open into a first-type inlet chambers 676a and 676b (collectively referred to herein as chamber 676) and second-type seed inlet 678 may open into a second-type inlet chambers 680a and 680b (collectively referred to herein as chamber 680). The inlet chambers 676 and 680 may be separated from each other and from various other areas of the valve 670 by various separators 694. In certain embodiments, the inlet chambers 676 and 680 may include upper portions 676a and 680a within the valve body 672 and lower portions 676b and 680b within a generally conical lower portion 682 of the seed valve 670.

A valve passage 698 may extend axially (i.e., vertically as depicted in FIGS. 17 and 18) within the valve body 672 and may include notched evacuation openings 706 at an upper end. As depicted, the valve passage 698 may be a single tubular passage oriented axially along the valve body 672 (e.g., along a centerline of the valve body 672). Other configurations may be possible, however, including configurations having multiple passages 698, one or more passages 698 divided into separate flow channels, passages 698 with other geometry, or passages 698 oriented differently within (or around) the valve 670

At its lower end, the valve passage 698 may connect (directly or indirectly) to a seed passage 700. The seed passage 700 may include a seed duct (or ducts) of various configurations (e.g., a single-passage duct, a duct divided into multiple passages, and so on) and may generally provide a conduit for seed between the seed valve 670 and a seed pool (e.g., the seed pool 160 of the seed meter 124).

In certain embodiments, a vacuum may be applied to the seed valve 670. For example, a vacuum dome 704 may surround the upper end of the valve passage 698 and may provide a seal with the valve body 672. The vacuum dome 704 may be in communication with a vacuum source (not shown), and may seal with the valve body 672 in order for the vacuum to be maintained. In certain embodiments, such a vacuum may be applied continuously. In certain embodiments, such a vacuum may be applied only as needed.

To control the flow of seed within the seed valve 670, a number of movable valve members 710a and 710b (referred to collectively herein as valve member 710), and 724 may be oriented within the valve passage 698. In certain embodiments, the valve member 710 may be in communication with one or more motors or other power sources (not shown in FIGS. 17 and 18) which may be utilized to controllably rotate the valve member 710 and 724. As depicted, the valve members 710 and 724 may be generally tubular members with unified internal passages. Other configurations may be possible, however, including configurations having other geometry, multiple internal passages (e.g., different internal passages for different seed types), and so on.

As depicted, the valve member 710 is divided into valve members 710a and 710b, which may generally move in unison during operation of the seed valve 670. In contrast, in the embodiment depicted, the valve member 724 may be formed as a unitary (i.e., single-piece or integrally connected) valve member. It will be understood that various alternative configurations may be possible for this and other embodiments of the contemplated seed valves. For example, the valve member 710 may be formed as a single piece, the valve member 724 may be formed as multiple pieces, or various additional (or alternative) valve members may be provided.

As depicted most clearly in FIG. 18, the valve members 710a, 710b, and 724 are configured as generally cylindrical sleeves, each including, respectively, a flange 712a, 712b, and 726. The outer circumference of the flanges 712*a*, 712*b*, and 726 (or another feature of the various valve members) may include a toothed profile in order to allow a geared mechanism to rotate the valve members 710*a*, 710*b*, and 724. In the embodiment depicted, a lower cylindrical portion of the valve member 724 may be nested within the cylindrical sleeve of the valve member 710*b*, and an upper cylindrical portion of the valve member 724 may be nested within the cylindrical sleeve of the valve member 710*a*. It will be understood, however, that various other configurations may be possible. (Reference herein to flanges 712 may be viewed as referring collectively to both of the flanges 712*a* and 712*b*.)

Also to control the flow of seed within the seed valve 670, various control openings may be provided. For example, each flange 712*a*, 712*b*, and 726 may include, respectively, a flange control opening 714*a*, 714*b*, and 728. In certain embodiments, the various flange control openings 714*a*, 714*b*, and 728 may be similarly sized. In certain embodiments, the cylindrical portions of the valve members 710*a* and 724 may further include, respectively, evacuation control openings 718 and 732, which may also be similarly sized. The evacuation control openings 718 and 732 may be axially aligned with each other and with evacuation opening 706 when valve 670 is fully assembled. The evacuation control openings 718 and 732 may not be angularly aligned, respectively, with the flange control openings 714*a* and 728 and may not be physically aligned (i.e., physically overlap) with each other when the flange control openings 714*a* and 728 align. (Reference herein to flange openings 714 may be viewed as referring collectively to both of the flange openings 714*a* and 714*b*.)

In certain embodiments, the cylindrical portions of valve members 710*b* and 724 may further include, respectively, feed control openings 716 and 730. In certain embodiments, the feed control opening 730 on the valve member 724 may be larger than the feed control opening 716 on the valve member 710*b*. For example, the feed control opening 730 may extend over twice the circumferential distance on the valve member 724 as does the feed control opening 716 on the valve member 710*b*. In the embodiment depicted, when the flange control openings 728 and 714 align, the feed control openings 716 and 730 may also align. Further, because the feed control opening 730 may be larger than the feed control opening 716, the two feed control openings 716 and 730 may also sometimes partially align when the flange control openings 728 and 714 are not aligned.

Various additional (or alternative) features may be provided. As depicted in FIGS. 17 and 18, for example, various brushes 696 may be provided on separators 694. As the valve members 710 and 724 are rotated, the flanges 712 and 726 may move past seed contained within the seed valve 670 and may tend, accordingly, to carry the seed along the direction of rotation. In this case, and others, the brushes 696 may generally prevent seed from being pressed into sharp edges or corners or otherwise damaged by the flanges 712 and 726 or other components or features. In certain embodiments, brushes 696 may be supplemented (or replaced) by other flexible members providing similar functionality. For example, various foam inserts (not shown) may be utilized in place of the brushes 696 to protect seed within the seed valve 670.

An example operation of the seed valve 670 to control planting of two seed types will now be described. It will be understood that similar structure and operation may be employed, in other embodiments, to control the planting of a different number of seed types (e.g., three or more seed types). In the operation depicted in FIGS. 19-26, the valve members 710 and 724 may be considered as executing stepped, counterclockwise rotation (from a perspective looking down from the vacuum source). Further, as depicted, both of valve members 710*a* and 710*b* may rotate in unison. It will be understood, however, that alternative rotation or other movement may be possible. The flow path of seeds in FIGS. 19-26 is indicated with block arrows.

In order to control flow of seed through the valve 670 the valve member 724 may be rotated through various orientations including first through fourth positions (e.g., as depicted in FIGS. 19, 20, 22, and 24, respectively). Similarly, the valve members 710 may be rotated through various orientations including fifth through eighth positions (e.g., as depicted in FIGS. 19, 21, 23, and 25, respectively). Referring in particular to FIG. 19, a seeding cycle for the seed valve 670 may begin with first-type seed flowing through inlet 674 (e.g., from an associated hopper or from storage tanks 113). The valve members 710 and 724 may be rotated (e.g., by one or more stepper motors (e.g., as shown in FIG. 27)), respectively, to the fifth and first positions, such that the flange control openings 728 and 714 are aligned along the first-type inlet chamber 676, as are the feed control openings 716 and 730. Accordingly, first-type seed may flow from the inlet 674, through the first-type inlet chamber 676, and the various control openings 714, 728, 716 and 730, and into the seed passage 700. With the seed passage 700 in communication with the seed pool 160, the seed pool 160 may accordingly be filled 502 with first-type seed and the metering member 146 may operate 510 to meter the first-type seed for planting. It will be noted, in the configuration depicted in FIG. 19, that the evacuation control opening 718 of the valve member 710*a*, but not the evacuation control opening 732 of the valve member 724, may be aligned with the evacuation opening 706 of the valve passage 698.

After some amount of time of operation 510 of the metering member 146, it may be appropriate to transition from first-type seed to second-type seed. For example, a GPS-enabled controller (not shown) may determine that the seeding machine 110 is about to enter a portion of the field in which second-type seed is to be planted, an operator may indicate in various ways that planting of second-type seed should begin, or various other mechanisms or devices may determine that a change between seed types may be appropriate. Therefore, it may be appropriate to evacuate 514 the first-type seed from the seed pool 160. To facilitate this evacuation 514, referring in particular to FIG. 20, the valve member 724 may be rotated to the second position, such that the flange control opening 728 no longer aligns with the flange control openings 714. This same rotation of the valve member 724 may also align the evacuation control opening 732 with the evacuation control opening 718 and the evacuation opening 706 above the first-type temporary storage chamber 688, while leaving the feed control opening 716 aligned with the feed control opening 730. Accordingly, due to the vacuum applied by the vacuum source, first-type seed may flow from the seed pool 160, through the seed passage 700 and the valve members 710 and 724, out the openings 706, 718 and 732, and into the first-type temporary storage chamber 688. It will be noted that any first-type seed left in lower first-type inlet chamber 676*b* after the filling 502 operation of FIG. 19 may also be drawn by the vacuum into the first-type temporary storage chamber 688, due to the alignment of the feed control openings 716 and 730. During the evacuation 514 of first-type seed from the seed meter 124, the metering member 146 may be supplied 522 with seed from a supplemental seed chamber, in order to facilitate continuous operation 518 of the metering member 146.

With the first-type seed appropriately evacuated 514 from the seed pool 160, the seed pool may then be supplied 524 with second-type seed from the second-type temporary storage chamber 690. Referring in particular to FIG. 21, the valve members 710a and 710b may be rotated to the sixth position, such that the flange control openings 714a and 714b align with the flange control opening 728 along the second-type temporary storage chamber 690. Further, such rotation may align the feed control openings 716 and 730 below the storage chamber 690. Accordingly, the second-type seed may flow from the second-type temporary storage chamber 690, through the openings 714, 728, 716 and 730, and through the valve members 710 and 724 to the seed passage 700. With seed passage 700 in communication with the seed pool 160, the seed pool 160 may accordingly be supplied 522 with second-type seed and the second-type seed may be metered by the continuously operating 518 metering member 146 for planting. It will be noted, in the configuration of FIG. 21, that the evacuation control openings 732 and 718 are not aligned with each other and are not aligned with evacuation opening 706.

With the seed meter 124 appropriately "primed" by the supply 524 of second-type seed from the second-type temporary storage chamber 690, the seed pool 160 may then be filled 526 with second-type seed from an associated hopper (or storage tanks 113). Referring in particular to FIG. 22, for example, the valve member 724 may be rotated to the third position, such that the flange control opening 728 no longer aligns with the flange control openings 714. Accordingly, the flow of second-type seed from second-type temporary storage chamber 690 may cease. It will be noted that the feed control opening 716 may remain aligned with the feed control opening 730, due to the larger size of the feed control opening 730.

Referring in particular to FIG. 23, the valve members 710 may then be rotated to the seventh position, such that the flange control openings 728 and 714 are aligned along the second-type inlet chamber 680, as are the feed control openings 716 and 730. Accordingly, second-type seed may flow from the inlet 678, through the second-type inlet chamber 680, and the various control openings 714, 728, 716 and 730, and into the seed passage 700. With the seed passage 700 in communication with the seed pool 160, the seed pool 160 may accordingly be filled 526 with second-type seed and the metering member 146 may operate 530 to meter the second-type seed for planting. It will be noted, in the configuration depicted in FIG. 23, that the evacuation control opening 718 of the valve member 710a, but not the evacuation control opening 732 of the valve member 724, may be aligned with the evacuation opening 706 of the valve passage 698.

After some amount of time of operation 530 of the metering member 146, it may be appropriate to transition from second-type seed back to first-type seed. Therefore, it may be appropriate to evacuate 534 the second-type seed from the seed pool 160. To facilitate this evacuation 534, referring in particular to FIG. 24, the valve member 724 may be rotated to the fourth position, such that the flange control opening 728 no longer aligns with the flange control openings 714. This same rotation of the valve member 724 may also align the evacuation control opening 732 with the evacuation control opening 718 and the evacuation opening 706 above the second-type temporary storage chamber 690, while leaving the feed control opening 716 aligned with the feed control opening 730. Accordingly, due to the vacuum applied by the vacuum source, second-type seed may flow from the seed pool 160, through the seed passage 700 and the valve members 710 and 724, out the openings 706, 718 and 732, and into the second-type temporary storage chamber 690. It will be noted that any second-type seed left in lower second-type inlet chamber 680b after the filling 526 operation of FIG. 23 may also be drawn by the vacuum into the second-type temporary storage chamber 690, due to the alignment of the feed control openings 716 and 730. During the evacuation 534 of second-type seed from the seed meter 124, the metering member 146 may be supplied 522 with seed from a supplemental seed chamber, in order to facilitate continuous operation 518 of the metering member 146.

With the second-type seed appropriately evacuated 534 from the seed pool 160, the seed pool 160 may then be refilled 538 with first-type seed. Referring in particular to FIG. 25, the valve member 710 may be rotated to the eighth position, such that the flange control openings 714 align with the flange control opening 728 along the first-type temporary storage chamber 688. Further, such rotation may align the feed control openings 716 and 730 below the storage chamber 688. Accordingly, first-type seed may flow from the first-type temporary storage chamber 688, through the openings 714, 728, 716 and 730, and through the valve members 710 and 724 to the seed passage 700. With seed passage 700 in communication with the seed pool 160, the seed pool 160 may accordingly be refilled 538 with first-type seed and the first-type seed may be metered by the continuously operating 518 metering member 146 for planting. It will be noted, in the configuration of FIG. 25, that the evacuation control openings 732 and 718 are not aligned with each other and are not aligned with evacuation opening 706.

With the seed meter 124 appropriately "primed" by the refilling 538 operation, the cycle may then repeat. For example, referring in particular to FIG. 26, the valve member 724 may be rotated again to the first position, such that the flange control opening 728 no longer aligns with the flange control openings 714. Accordingly, the flow of first-type seed from first-type temporary storage chamber 688 may cease. Another rotation of the valve members 710 may then return the valve 670 to the configuration depicted in FIG. 19 in which the seed pool 160 may be replenished 546 with first-type seed from first-type seed inlet 674.

In the configuration depicted in FIGS. 19-26, the valve 670 may be transitioned between subsequent operations of an MTSM method through the step-wise, alternating rotation of the valve members 710 and 724. Referring also to FIGS. 27, 28A and 28B, an example system for controlling such rotation is depicted. In certain embodiments, for example, a stepper motor 734 may be provided, which may be controlled by various internal or external systems (not shown). The stepper motor 734 may be mounted in various ways to the valve 670. As depicted, for example, the stepper motor 734 is connected to the lower portion 682 of the seed valve 670.

The motor 734 may provide rotational power (e.g., for step-wise rotation) to a first driven gear 738 via an output shaft 736 (or similar feature). The first driven gear 738 may be connected by a first gear shaft 742 to a first pawl member 744 with various flexible arms 744a. A first drive gear 740 may be oriented around the first pawl member 744, with the gear 740 including various internal notches 746 with complimentary geometry to the flexible arms 744a. As depicted in FIGS. 27, 28A and 28B, the first drive gear 740 may be a double gear, such that the gear 740 may simultaneously engage both of the flanges 712a and 712b of the valve members 710a and 710b.

A second driven gear 748 may be meshed with the first drive gear 740 such that the second driven gear 748 rotates simultaneously with the first driven gear 738, but in the opposite direction. The second drive gear may be connected by a second gear shaft 752 to a second pawl member 754 with various flexible arms 754a. A second drive gear 750 may be oriented around the second pawl member 754, with the gear 750 including various internal notches 756 with complimentary geometry to the flexible arms 754a. As depicted in FIGS. 27, 28A and 28B, the second drive gear 750 may be a single gear that engages only the flange 726 of the valve member 724.

During execution of an MTSM method (or similar functionality), the stepper motor 734 may execute alternating, step-wise rotations in opposite directions in order to sequentially and alternately advance rotation of the valve members 710 and 724, with each of the valve members 710 and 724 rotating in the same direction. For example, rotation of the motor 734 in a first direction may cause the driven gear 738 to rotate in a clockwise direction (as viewed from above in FIGS. 27, 28A and 28B). Accordingly, the arms 744a of the pawl 744 may engage the notches 746 of the drive gear 740, thereby causing the drive gear 740, and correspondingly the valve members 710a and 710b, to rotate. Because the gear 748 may rotate in an opposite (i.e., counter-clockwise) direction, however, the arms 754a of the pawl 754 may slip past the notches 756 of the drive gear 750 and the drive gear 750 may not cause the valve member 724 to rotate. In this way, therefore, rotation of the motor 734 in the first direction may cause the valve member 710a and 710b, but not the valve member 724, to advance.

Continuing, rotation of the motor 734 in a second direction may cause the drive gear 738 to rotate in a counter-clockwise direction (as viewed from above in FIGS. 27, 28A and 28B). Accordingly, the arms 744a of the pawl 744 may slip past the notches 746 of the drive gear 740 and the drive gear 740 may not cause the valve members 710a and 710b to rotate. Because the gear 748 may rotate in an opposite (i.e., clockwise) direction, however, the arms 754a of the pawl 754 may engage the notches 756 of the drive gear 750, thereby causing the drive gear 750, and correspondingly the valve member 724, to rotate. In this way, therefore, rotation of the motor 734 in the second direction may cause the valve member 724, but not the valve members 710 and 710b, to advance.

It will be understood that various other configurations may be possible. In certain embodiments, for example, a one-way transmission device other than the pawl members 744 and 754 may be utilized. In certain other embodiments, a clutch or other friction device may be utilized, or multiple motors may be utilized.

Figure 29:
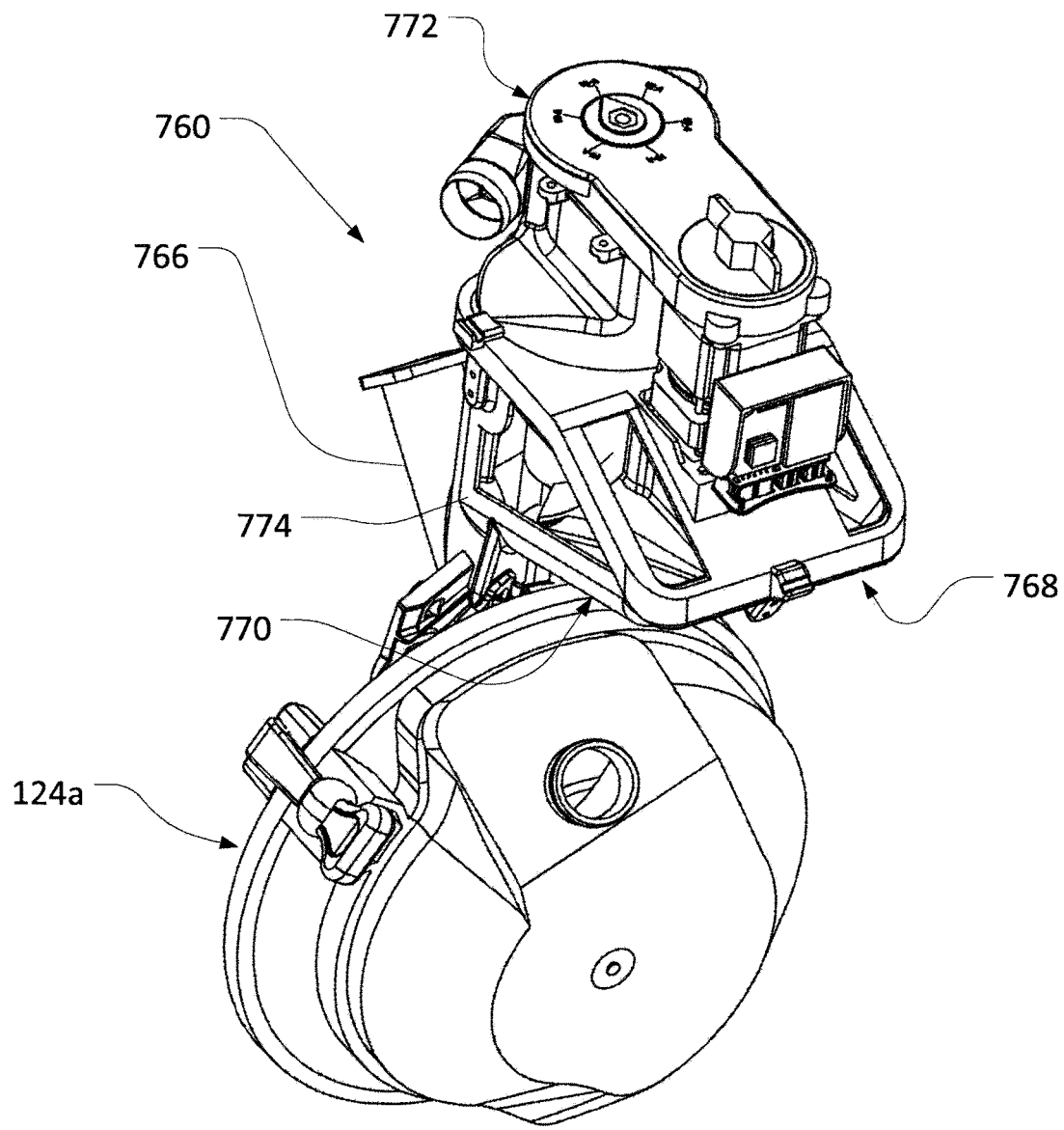
FIGS. 29 and 30 are perspective views of yet another example seed valve mounted to a seed meter similar to the seed meter of FIG. 2.
Figure 30:
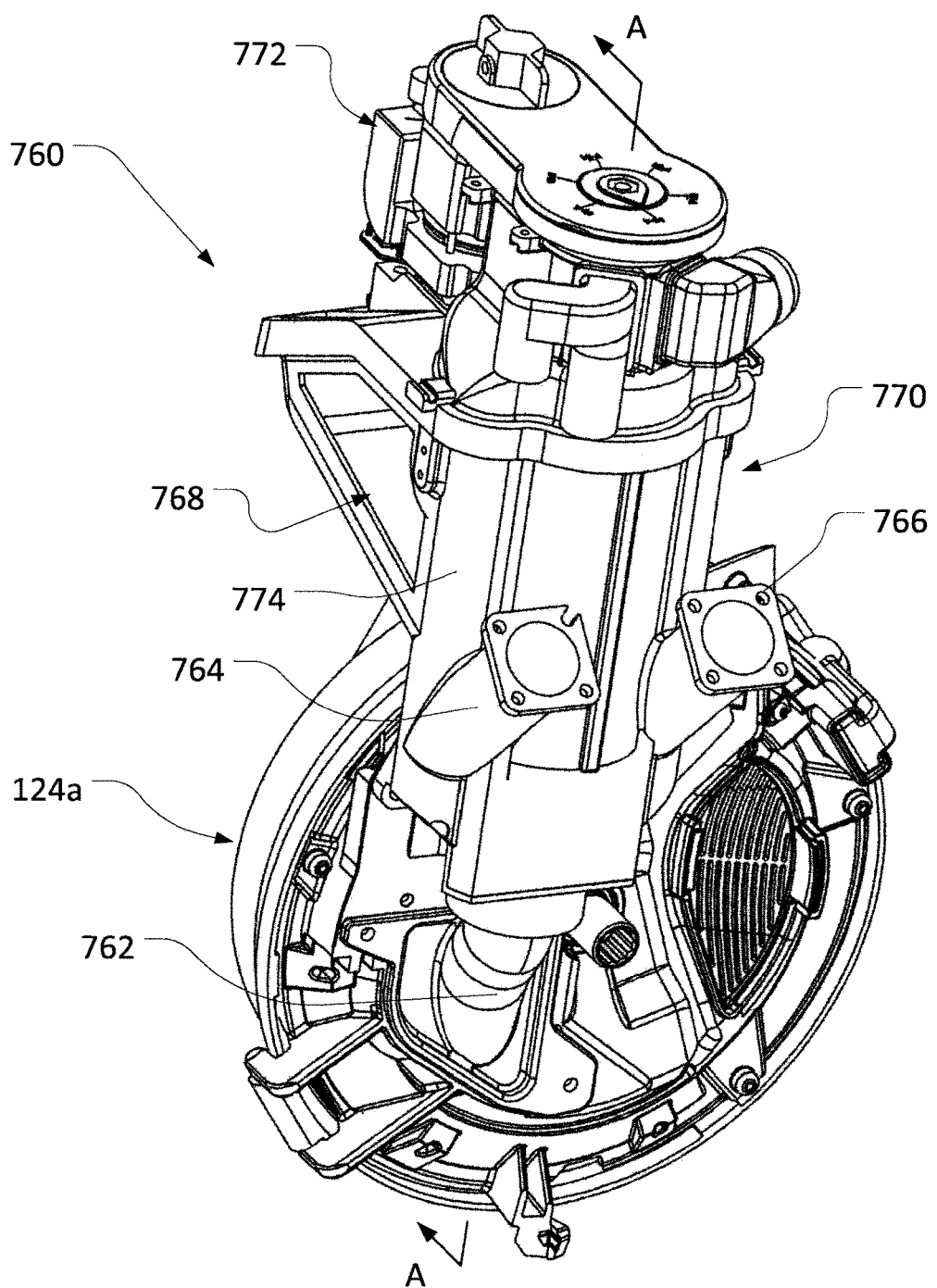

Various other seed valve configurations may operate in similar ways in order to facilitate execution of an MTSM method or other seed management operations. Referring also to FIGS. 29 through 131, for example, seed valve 760 may be mounted to a seed meter 124a (which may be generally similar to the seed meter 124) in order to control the flow of various seed types into and out of the seed meter 124a. The seed valve 760 may include valve body 774, which may enclose various mechanisms and components. First-type seed may be provided to the seed valve 760 via a first-type seed inlet 764, which may be in communication with one or more of the storage tanks 113, an associated seed hopper, or another first-type seed receptacle. Similarly, second-type seed may be provided to the seed valve 760 via a second-type seed inlet 766, which may be in communication with one or more of the storage tanks 113, an associated seed hopper, or another second-type seed receptacle. A seed passage 762 may extend from a lower end of the valve body 774 in order to provide a flow path for seed between the valve body 774 and a seed pool (or seed pools) within the seed meter 124a.

Figure 32:
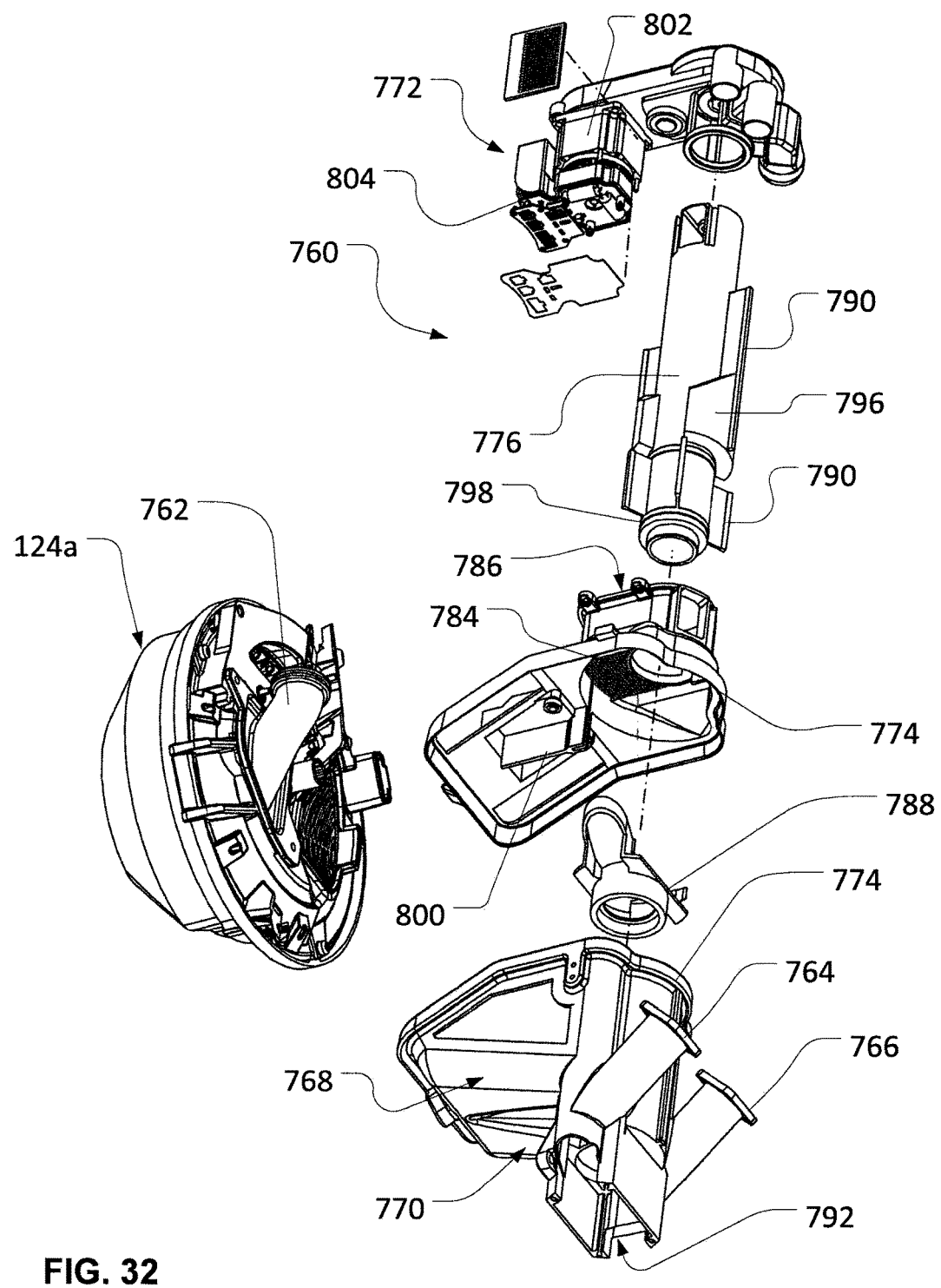
FIG. 32 is an exploded perspective view of the seed valve and seed meter of FIGS. 29 and 30.

The valve body 774 of the seed valve 760 may define, at least in part, a first-type temporary storage chamber 768 and a second-type temporary storage chamber 770 separated by various internal dividers (e.g., separator 800, as depicted in FIG. 32). In certain embodiments, the temporary storage chambers 768 and 770 may be oriented generally above the seed inlets 764 and 766. It will be understood, however, that other configurations may be possible. An internal valve passage 792 may extend between the temporary storage chambers 768 and 770, the seed inlets 764 and 766 and the seed passage 762.

In certain embodiments, a rotatable valve member 776 may be nested within the internal valve passage 792 in order to controllably provide a flow passage for seed between one or more of the temporary storage chambers 768 and 770, the seed inlets 764 and 766, and the seed passage 762 leading to the seed meter 124a. In the embodiment depicted, the valve member 776 (shown in detail in FIGS. 33-35) may be a generally cylindrical member having an internal flow passage 794 extending between an evacuation control opening 780 and the seed passage 762. Additional control openings may also be provided. For example, a primary feed control opening 778 may be axially aligned with the two seed inlets 764 and 766 when the valve member 776 is appropriately nested within the valve passage 792. Similarly, a temporary storage outlet control opening 782 may be axially aligned with a lower portion of the two temporary storage chambers 768 and 770 when the valve member 776 is appropriately nested within the valve passage 792. In certain embodiments, the control openings 778, 780, and 782 may be angularly aligned on the valve member 776, such that at any orientation of the valve member 776 only one of the openings 778, 780, and 782 may be physically aligned, respectively, with a seed inlet 764 or 766 or a temporary storage chamber 768 or 770. The control openings 778 and 782 may also be configured such that the openings 778 and 782 may align, respectively, with only one of the seed inlets 764 and 766 at once and only one of the temporary storage chambers 768 and 770 at once.

In certain embodiments, various fins or vanes 790 or other features may be provided to assist in orienting and securing the valve member 776 within the seed valve 760. In the embodiment depicted, such fins 790 may be included on various sleeves 796 or collars 798, which may allow the fins 790 to remain stationary as the internal flow passage 794 rotates.

Figure 31:
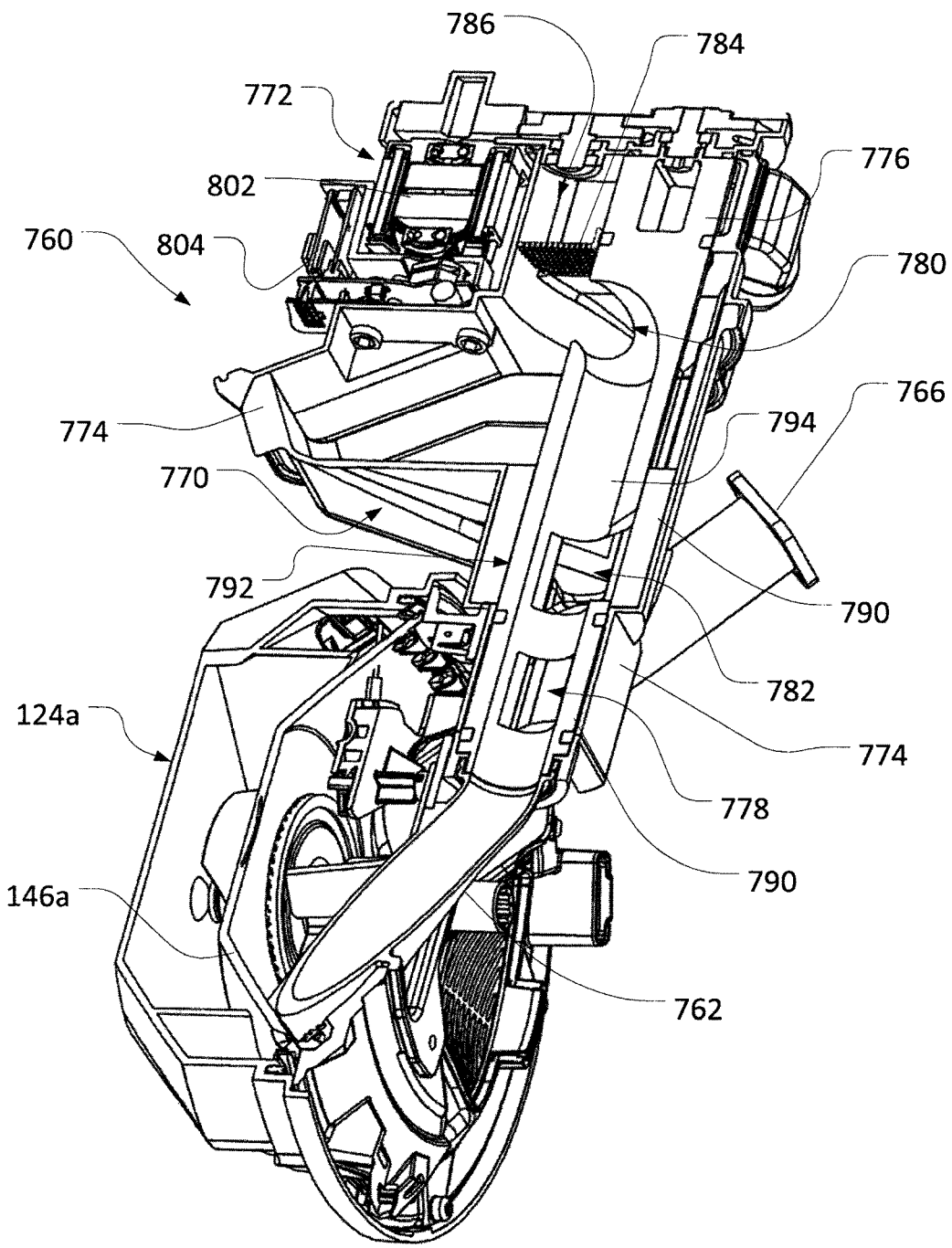
FIG. 31 is a perspective view of the seed valve and seed meter of FIGS. 29 and 30, depicting a cross-section along plane A-A of FIG. 30.

As depicted, an actuation and control assembly 772 may be oriented at the upper end of the valve body 774. The actuation and control assembly 772 may include various control mechanisms, including, for example, one or more motors 802 (see FIG. 31) and one or more controllers 804 (e.g., one or more computing devices or mechanical timing devices) (see FIG. 32) for controlling the rotation of the valve member 776. In certain embodiments, the actuation and control assembly 772 may include, or may be in communication, with a vacuum source that provides a vacuum to vacuum chamber 786, which may be separated from the temporary storage chambers 768 and 770 by one or more filters or screens 784.

The seed valve 760 may operate in a generally similar manner as the seed valve 670 (see FIGS. 19-26) and the seed valve 600 (see FIGS. 11-16), with the valve member 776 being rotated in order to provide, via the various control openings 778, 780, and 782, a flow path for seed between various portions of the seed valve 760 and the seed meter 124a. For example, the valve member 776 may be rotated to align the feed control opening 778 with one of the seed inlets 764 and 766 in order to provide a flow path for first-type or second-type seed, respectively, from a seed hopper (not shown) into a seed pool of the seed meter 124a. Similarly, the valve member 776 may be rotated to align the temporary storage outlet control opening 782 with one of the temporary storage chambers 768 and 770 in order to prime a seed pool with first-type or second-type seed, respectively. The valve member 776 may also be rotated to align the evacuation control opening 778 with the vacuum chamber 786 and one of the temporary storage chambers 768 and 770 in order to evacuate first-type or second-type seed, respectively, from the seed meter 124a.

Referring also to FIG. 36, various internal components of the seed meter 124a are depicted. Within the seed meter 124a, seed may be provided in a primary seed pool 812 in order to be captured by metering member 146 (not shown in FIG. 36) or a similar device for transport along a seed path 808. As depicted in FIG. 36, the seed passage 762 may provide a flow path for seed between the seed valve 760 and the seed pool 812 of the seed meter 124a in order to fill the seed pool 812 with seed of various types.

As depicted, the seed passage 762 may be a single seed duct with a unitary internal flow path and a unitary feed opening 810 near the seed pool 812. As such, filling 502 and 526, refilling 538, supplying 522, replenishing 546, and evacuating 514 and 534 seed to and from the seed pool 812 (under the MTSM method 500) may be accomplished via a single flow path through the seed passage 762 and through the single feed opening 810. Other configurations may be possible, however. For example, seed passage 762 may include multiple distinct seed ducts (not shown), one or more seed ducts with distinct internal flow paths (e.g., as provided by various internal dividers) (not shown), multiple feed openings (not shown), and so on, with different seed ducts, flow paths, or feed openings being utilized for various different operations of the MTSM method 500.

Similarly, although the seed pool 812 is depicted as single seed pool, in certain embodiments, the seed pool 812 may be separated into multiple distinct seed pools (not shown). For example, seed pool 812 may be divided into a first seed pool for first-type seed and a second seed pool for second-type seed, or any number of other distinct seed pools. In such a configuration, the unitary seed passage 762 may provide seed to each of the seed pools, or the seed pools may be separately fed by distinct seed passages, flow paths, feed outlets, and so on (not shown).

As noted above, the MTSM method 500 (and similar methods) may include continuously operating 518 a metering member, even during evacuation 514 or 534 of various seeds from the seed meter 124a. In order to ensure that a relatively steady stream of seeds is provided for transport during this continued operation 518, it may be useful to provide a supplemental seed chamber 814 (e.g., a mini seed pool) within the seed meter 124a. In certain embodiments, the supplemental chamber 814 may be oriented such that seed may remain within the supplemental chamber 814 even during an evacuation 514 or 534 of the seed pool 812. This may allow a metering member to collect seed from the supplemental chamber 814 for delivery to a seed delivery system 126 even when the seed pool 812 has been (or is being) evacuated 514 and 534. In certain embodiments, the supplemental chamber 814 may be generally smaller than the seed pool 812, or otherwise configured to hold fewer seeds than the seed pool 812. In certain embodiments, for example, the supplemental chamber 814 may be configured to hold a maximum of approximately forty seeds.

In certain embodiments, the supplemental chamber 814 may be entirely separate from the primary seed pool 812 of the seed meter 124a. In certain embodiments, the supplemental chamber 814 may be separated from the seed pool 812 by one or more dividers, but may remain partially open to the seed pool 812 such that some seeds may pass between the chamber 814 and the seed pool 812. In this sense, in certain embodiments, the supplemental seed chamber 814 may be viewed as a supplemental seed pool separated in various ways from a primary seed pool (e.g., the seed pool 812). Still referring to FIG. 36, for example, a baffle 816 may be provided upstream of the feed opening 810 of the seed passage 762 (from the perspective of the seed path 808) in order to providing a partial barrier between the seed pool 812 and the supplemental chamber 814. As depicted, the baffle 816 may include various brushes in order to restrain, but not entirely prohibit, movement of seed between the chamber 814 and the seed pool 812. Other configurations may be possible, however, including baffles without brushes, rigid baffles, and so on.

As depicted in FIG. 36, the baffle 816 may cooperatively define the boundaries of the supplemental seed chamber (or mini seed pool) 814 with brushes 818 (or another device constraining the movement of seed into or out of the seed chamber 814). The baffle 816 and the brushes 818 may be configured such that the supplemental seed chamber 814 may contain an appropriate amount of seed for when the primary seed pool 812 has been evacuated 514 or 534. In certain embodiments, for example, the baffle 816 and the brushes 818 may be configured such that the supplemental seed chamber 814 may have the capacity to contain the amount of seed that is necessary for continuous seeding operation during a transition between different seed types. Further, the baffle 816 may be configured such that an appropriate amount of seed may pass from the feed opening 810 or the seed pool 812 into the supplemental seed chamber 814, and so that the seed in the supplemental seed chamber 814 may be appropriately carried by the metering member (not shown in FIG. 36) for discharge to a seed delivery system (not shown in FIG. 36) when the seed pool 812 has been evacuated 514 or 534. For example, the brushes of baffle 816 may allow seed to be carried by a metering member (not shown) along the seed path 808, but may not allow seed to pass across the brushes in the opposite direction (i.e., from the primary seed pool 812). Rather, the supplemental seed chamber 814 may be filled by seed spilling over the top of the baffle 816 as the seed exits the feed opening 810 (or overfills the primary seed pool 812).

Figure 37:
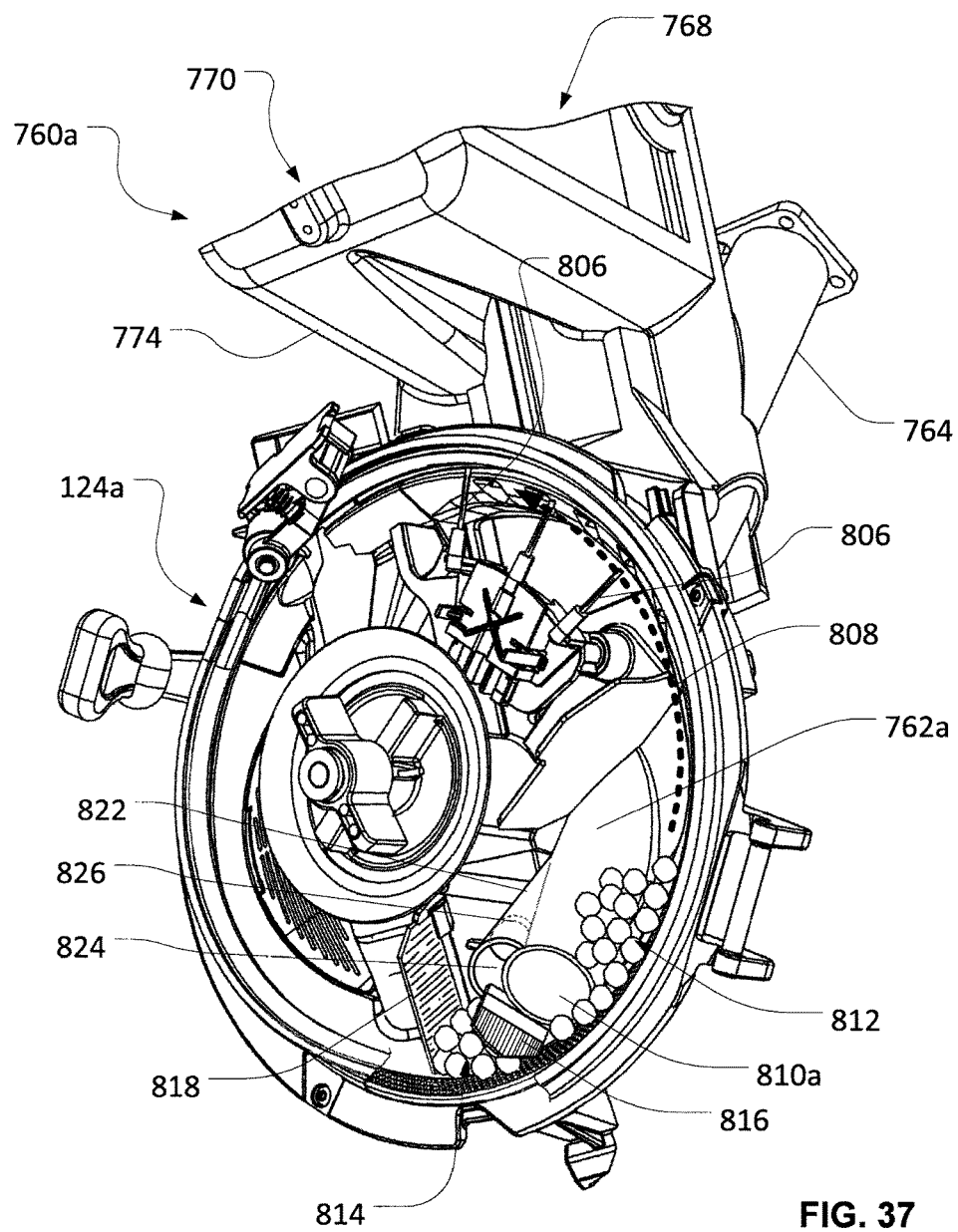
FIG. 37 is another perspective view showing another example arrangement of internal components of the seed meter of FIGS. 29 and 30.

In certain embodiments, a one-way valve may be provided in various flow paths to regulate the flow of seed along the flow paths. Referring to FIG. 37, for example, modified seed passage 762a may include primary feed opening 810a to provide seed to the seed pool 812. Further, seed passage 762a may include supplemental passage 822 leading to supplemental feed opening 824 to provide seed to the supplemental seed chamber 814. In certain embodiments, a one-way valve 826 may be provided within the supplemental passage 822 in order to allow seed to flow into the supplemental seed chamber 814 through the supplemental passage 822 while preventing seed from flowing out of the supplemental seed chamber 814 through the supplemental passage 822. Accordingly, when seed flows into the seed meter 124a through the seed passage 762a, the seed may be provided to both the primary seed pool 812 and the supplemental seed chamber 814. However, when seed flows out of the seed meter 124a through the seed passage 762a (e.g., as drawn by a vacuum applied via the seed valve 760), seed may flow out of the primary seed pool 812, but not the supplemental seed chamber 814, due to the operation of the one-way valve 826.

In certain embodiments, the supplemental passage 822 may provide an entirely distinct flow path for seed between the seed valve 760 and the seed meter 124a. As such, for example, seed routed through the seed passage 762a may flow only between the seed valve 760 and the primary seed pool 812, and seed routed through the supplemental passage 822 may flow only between the seed valve 760 and the supplemental seed chamber 814. To control such a flow, the seed valve 760 may include various switching means to selectively route seed to either of passages 762a and 822 (e.g., as described above). For example, the seed valve 760 may include a flapper or other mechanism (not shown) to selectively route seed through one of the seed passages 762a and 822 to, respectively, the seed pool 812 or the supplemental seed chamber 814.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions or in various other ways, including through mechanical timing devices. Such computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It will be understood that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be understood that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s).

For example, the general orientation of the seed meter and delivery system can differ from that depicted in the figures. In particular, the figures illustrate a generally vertically oriented delivery system. However, the delivery system can instead be generally horizontal or an arbitrary angle to the horizon. Therefore, any words of orientation, such as various forms of "up", "down", "top", "bottom," "above," and "below", used herein are for the purpose of describing particular embodiments only and are not intended to be limiting of the disclosure.

Having described the multi-type seed valves and seed planting method, it will become apparent that various modifications can be made without departing from the scope of the accompanying claims.

What is claimed is:

1. A method of operating a planting machine, the planting machine having a seed meter with a housing forming an interior space for a seed pool and a metering member, the metering member being operable to meter seed from the seed pool and deliver metered seed for discharge from the housing, the method comprising:
   filling the seed pool with first-type seed;
   operating the metering member to meter the first-type seed from the seed pool;
   evacuating, at least in part, the first-type seed from the seed pool into a first-type temporary storage chamber;
   filling the seed pool with second-type seed;
   operating the metering member to meter the second-type seed from the seed pool;
   evacuating, at least in part, the second-type seed from the seed pool into a second-type temporary storage chamber;
   refilling the seed pool with the first-type seed drawn from, at least in part, the first-type temporary storage chamber;
   operating the metering member to meter the first-type seed from the seed pool; and
   while operating the metering member to meter the first-type seed after refilling the seed pool with the first-type seed, replenishing the seed pool with first-type seed drawn from a bulk storage container of first-type seed, the bulk storage container being separate from the first-type temporary storage chamber.

2. The method of claim 1, wherein the seed pool is filled with the first-type seed through a seed passage and the first-type seed is evacuated from the seed pool through the seed passage.

3. A planting machine, further comprising:
   a seed meter with a housing forming an interior space for a seed pool and a metering member, the metering member being operable to meter seed from the seed pool and discharge metered seed from the housing;

a valve body;

at least one seed passage between the valve body and the interior space of the housing;

the valve body having a first-type seed inlet chamber for a first-type seed from a first-type seed bulk storage, a second-type seed inlet chamber for a second-type seed from a second-type bulk storage, a first-type temporary storage chamber for first-type seed from the seed pool and a second-type temporary storage chamber for second-type seed from the seed pool, wherein each of the first-type seed inlet chamber, the second-type seed inlet chamber, the first-type temporary storage chamber and the second-type temporary storage chamber are selectively communicable with the at least one seed passage for supplying seed to the seed pool.

4. The planting machine of claim 3, further comprising:

a delivery system adapted to receive seed from the metering member at a release position and move seed from the release position to a discharge location adjacent a seed furrow formed in soil beneath the planting machine.

5. The planting machine of claim 4, wherein the delivery system includes a brush belt having bristles that receive seed at the release position and move the seed in the second direction.

6. The planting machine of claim 3, further comprising:

a vacuum dome providing a seal for at least a portion of the valve body, whereby connection of the valve body to a low pressure source provides a partial vacuum within at least one of the vacuum dome and the portion of the valve body.

7. The planting machine of claim 3, further comprising:

a valve member contained, at least in part, by the valve body, the valve member being movable between a first position in which seed from the first-type seed inlet chamber flows into the housing, a second position in which seed from the seed pool flows from within the housing to the first-type temporary storage chamber, a third position in which seed from the second-type temporary storage chamber flows into the housing, a fourth position in which seed from the second-type seed inlet chamber flows into the housing, a fifth position in which seed from the seed pool flows from within the housing to the second-type temporary storage chamber, and a sixth position in which seed from the first-type temporary storage chamber flows into the meter housing.

8. The planting machine of claim 7, wherein the valve member is rotatable in the valve body and is movable from the first position to the second position, from the second position to the third position, from the third position to the fourth position, from the fourth position to the fifth position from the fifth position to the sixth position and from the sixth position to the first position by rotation of the valve member in one direction.

9. The planting machine of claim 7, wherein the valve body includes a valve passage in fluid communication with the seed passage, the valve passage having a first-type temporary storage inlet opening, a second-type temporary storage inlet opening, a first-type temporary storage outlet opening, a second-type temporary storage outlet opening, a first-type primary feed opening, and a second-type primary feed opening;

wherein the valve member is contained, at least in part, by the valve passage, and includes a plurality of control openings;

wherein, with the valve member in the first position, at least one of the plurality of control openings of the valve member aligns with the first-type primary feed opening to allow seed to flow from the first-type seed inlet chamber into the housing;

wherein, with the valve member in the second position, at least one of the plurality of control openings aligns with the first-type temporary storage inlet opening to allow seed to flow from within the housing to the first-type temporary storage chamber;

wherein, with the valve member in the third position, at least one of the plurality of control openings of the valve member aligns with the second-type temporary storage outlet opening to allow seed to flow from the second-type temporary storage chamber into the housing;

wherein, with the valve member in the fourth position, at least one of the plurality of control openings of the valve member aligns with the second-type primary feed opening to allow seed to flow from the second-type seed inlet chamber into the housing;

wherein, with the valve member in the fifth position, at least one of the plurality of control openings of the valve member aligns with the second-type temporary storage inlet opening of the valve passage to allow seed to flow from within the housing to the second-type temporary storage chamber; and wherein, with the valve member in the sixth position, at least one of the plurality of control openings of the valve member aligns with the first-type temporary storage outlet opening to allow seed to flow from the first-type temporary storage chamber into the housing.

10. The planting machine of claim 9, wherein the plurality of control openings of the valve member includes first, second, and third control openings;

wherein the first control opening aligns with the first-type primary feed opening when the valve member is in the first position and aligns with the second-type primary feed opening when the valve member is in the fourth position;

wherein the second control opening aligns with the first-type temporary storage inlet opening when the valve member is in the second position and aligns with the second-type temporary storage inlet opening when the valve member is in the fifth position; and wherein the third control opening aligns with the second-type temporary storage outlet opening when the valve member is in the third position and aligns with the first-type temporary storage outlet opening when the valve member is in the sixth position.

11. The planting machine of claim 7, wherein the valve member includes a plurality of distinct valve-member components.

12. The planting machine of claim 3, further comprising:

a first valve member contained, at least in part, by the valve body, the first valve member being movable between first, second, third, and fourth positions; and a second valve member contained, at least in part, by the valve body, the second valve member being movable between fifth, sixth, seventh, and eighth positions;

wherein, with the first valve member at the first position and the second valve member at the fifth position, seed from the first seed inlet chamber flows into the housing;

wherein, with the first valve member at the second position and the second valve member at the fifth position, seed from the seed pool flows from within the housing to the first-type temporary storage chamber;

wherein, with the first valve member at the second position and the second valve member at the sixth position, seed from the second-type temporary storage chamber flows into the housing;

wherein, with the second valve member at the sixth position, moving the first valve member from the second position to the third position stops seed from flowing from the second-type temporary storage chamber into the housing;

wherein, with the first valve member at the third position and the second valve member at the seventh position, seed from the second seed inlet chamber flows into the housing;

wherein, with the first valve member at the fourth position and the second valve member at the seventh position, seed from the seed pool flows from within the housing to the second-type temporary storage chamber;

wherein, with the first valve member at the fourth position and the second valve member at the eighth position, seed from the first-type temporary storage chamber flows into the housing; and wherein, with the second valve member at the eighth position, moving the first valve member from the fourth position to the first position stops seed from flowing from the first-type temporary storage chamber into the housing.

13. The planting machine of claim 12, wherein the first valve member is rotatable in the valve body and is movable from the first position to the second position, from the second position to the third position, from the third position to the fourth position, and from the fourth position to the first position by rotation of the first valve member in an adjustment direction; and wherein the second valve member is rotatable in the valve body and is movable from the fifth position to the sixth position, from the sixth position to the seventh position, from the seventh position to the eighth position, from the eighth position to the fifth position by rotation of the second valve member in the adjustment direction.

14. The planting machine of claim 13, wherein the first valve member and the second valve member are rotated in the adjustment direction by a single motor.

15. A planting machine, comprising:
a seed meter with a housing forming an interior space;
an inlet seed passage for seed to flow into the housing; and
a metering member within the housing cooperating with the housing to form a seed pool within the housing for seed and a supplemental seed chamber for seed received in the housing through the seed inlet, the metering member operable to meter seed from both the seed pool and the supplemental seed chamber and deliver metered seed for discharge from the housing;
wherein seed is maintained in the supplemental seed chamber for operation of the seed meter when the seed pool has been evacuated.

16. The planting machine of claim 15, further comprising:
a one-way valve in the inlet seed passage, the one-way valve permitting flow of seed through the inlet seed passage into the supplemental seed chamber and preventing flow of seed out of the supplemental seed chamber through the inlet seed passage.

17. The planting machine of claim 15, further comprising:
a vacuum source, the vacuum source establishing at least a partial vacuum in communication with the seed pool to evacuate seed from the seed pool.

18. The planting machine of claim 15, further comprising:
a temporary storage chamber; and
a valve controlling the flow of seed both from the seed pool to the temporary storage chamber and from the temporary storage chamber to the seed pool.

\* \* \* \* \*